(12) United States Patent
Aliano, Jr.

(10) Patent No.: US 6,196,432 B1
(45) Date of Patent: *Mar. 6, 2001

(54) SYSTEM FOR ATTACHING A GOLF BAG TO A GOLF CAR

(76) Inventor: Joseph F. Aliano, Jr., 116 McClellen St., Philadelphia, PA (US) 19148

( * ) Notice: Subject to any disclaimer, the term of this patent is extended or adjusted under 35 U.S.C. 154(b) by 0 days.

This patent is subject to a terminal disclaimer.

(21) Appl. No.: 09/100,439

(22) Filed: Jun. 19, 1998

Related U.S. Application Data

(63) Continuation-in-part of application No. 09/032,137, filed on Feb. 27, 1998.

(51) Int. Cl.$^7$ .................................................... B60R 9/00
(52) U.S. Cl. .......................................... 224/274; 224/493
(58) Field of Search .................................. 224/274, 493, 224/613, 250, 251, 255, 401, 402, 567, 568, 570, 249; 206/315.3, 315.5; 280/DIG. 5, DIG. 6; 248/96, 230.8; 24/3.11, 3.12, 3.7, 170, 168

(56) References Cited

U.S. PATENT DOCUMENTS

| | | |
|---|---|---|
| 699,391 | 5/1902 | Johnson . |
| 1,266,680 * | 5/1918 | Hall ........................................ 24/309 |
| 1,468,711 * | 9/1923 | Dwyer ................................... 150/108 |
| 2,432,001 * | 12/1947 | Fisler ..................................... 150/108 |
| 2,577,333 | 12/1951 | Klum . |
| 2,716,432 | 8/1955 | Duffy . |
| 2,858,868 | 11/1958 | Wallace . |
| 2,887,137 | 5/1959 | Robb . |
| 3,603,540 * | 9/1971 | Gouge ..................................... 248/96 |
| 4,843,668 * | 7/1989 | Ideda ...................................... 24/170 |
| 4,843,688 * | 7/1989 | Ikeda ...................................... 24/170 |
| 5,080,239 | 1/1992 | Rowland . |
| 5,096,059 | 3/1992 | Henderson . |
| 5,215,194 * | 6/1993 | Blanford et al. .................. 206/315.3 |
| 5,269,410 | 12/1993 | Abregano . |
| 5,291,638 * | 3/1994 | Huang ..................................... 24/170 |
| 5,361,958 * | 11/1994 | Fiegel et al. .......................... 224/274 |
| 5,472,084 * | 12/1995 | Aliano, Jr. ......................... 206/315.3 |
| 5,526,894 * | 6/1996 | Wang ................................... 180/65.1 |
| 5,610,585 * | 3/1997 | Jobe ..................................... 340/568 |
| 5,634,557 * | 6/1997 | Shin et al. ......................... 206/316.6 |
| 5,727,642 * | 3/1998 | Abbott ................................ 180/65.1 |
| 5,765,691 * | 6/1998 | Hall ...................................... 206/579 |
| 5,842,565 * | 12/1998 | Hagaman .......................... 206/315.3 |

\* cited by examiner

*Primary Examiner*—Allan N. Shoap
*Assistant Examiner*—Maerena W. Brevard
(74) *Attorney, Agent, or Firm*—Caesar, Rivise, Bernstein, Cohen & Pokotilow, Ltd.

(57) ABSTRACT

A golf bag attachment system for transporting golf clubs is taught. The golf bag system uses a golf car having an attachment strap to secure the golf bag to the golf car. The attachment system includes a strap attachment device coupled to the golf bag for receiving and forcibly retaining the attachment strap to secure the golf bag to the golf car. A further strap is provided along with a further strap attachment for attaching the further strap to the golf bag and carrying the golf bag with the further strap. The attachment device includes a tightening device for detachably securing the attachment strap to the attachment device. The tightening device can be rotatable and can be rotatably advanced toward the attachment strap. The tightening device thus forcibly retains the attachment strap by pressing the attachment strap against the golf bag. Additionally, the tightening device can compressibly secure the attachment strap. The tightening device can be a wedge which can be a pivotable wedge. The attachment device can also be a lever, a set screw, or a push in clamp. The attachment device can include an attachment encasement for passing the attachment strap therethrough.

17 Claims, 28 Drawing Sheets

10

PRIOR ART

10

PRIOR ART

Fig. 7A Fig. 7B

SYSTEM FOR ATTACHING A GOLF BAG TO A GOLF CAR

This application is a continuation-in-part of U.S. patent application Ser. No. 09/032,137 filed Feb. 27, 1998.

BACKGROUND OF THE INVENTION

The present invention relates generally to a golf bag for use with a riding golf car and, in particular, to a golf bag attachment system which permits more secure transporting of a golf bag using a golf car.

A great deal of attention has been paid to the design of both golf cars and golf bags, in order to enable them to assist golfers in enjoying their game. The basic use of a golf bag is carrying a set of golf clubs and related smaller golf accessories. Presently many different types of golf bags are available to serve this basic purpose. The most common type of golf bag available is formed with an elongated, generally cylindrical body portion with a closed bottom. The top of the bag is open in order to allow golf clubs to be inserted handle first into the elongated body portion of the golf bag. A shoulder strap is adjustably fixed along one longitudinal side of the golf bag allowing it to be carried on the shoulder of the golfer. Several pockets are usually provided about the periphery of the golf bag for storage of the smaller golf accessories such as golf balls and tees. Larger pockets are sometimes also provided on golf bags for storage of other items such as clothing in order to make it easier for the user to change clothes when desired.

Riding golf cars provide convenient transportation for golfers as well as golf bags, golf clubs and any other items a golfer may wish to bring along while playing golf. Most riding golf cars are used on golf courses by pairs of golfers with their golf bags strapped to the back of the golf car. Conventionally golf bags are attached to golf cars using straps secured to a golf cart at a point; the strap is then secured to a golf bag attachment device which is in turn detachably secured to the golf car at a second point. However, the securing of the golf bags to the attachment device can sometimes be awkward and the bag is sometimes subject to inadvertent detachment.

When playing a game of golf one golfer may hit a ball to one side of a fairway and another golfer may hit a ball to the other side. Thus, one golfer may have to walk to one of the balls while the other golfer drives the golf car to the other ball. Sometimes a golf ball may be hit to an area of the golf course where a golf car cannot be driven. Additionally, golf cars are often restricted to limited areas of golf courses such as golf car paths, particularly in the vicinity of the greens.

Thus, there are several reasons why it can be sometimes necessary for a golfer to leave the golf car and carry one or more clubs to an area where a ball has been hit where it is not possible to drive the cart. In situations like these the golfer leaving the golf car normally removes one or more clubs from a golf bag and hand carries them to the location of the ball. Thus, it is desirable to have a convenient way for the golfer to carry the golf clubs under these circumstances.

Often a golfer who carries clubs to the ball is not sure which club will be needed. Therefore, golfers often carry a number of different clubs with them when they leave the cart. For example, in the vicinity of a green a golfer often carries one or more short irons and a putter to the location of the ball. While making the shot the golfer usually lays the unused clubs on the ground. The unused clubs are then retrieved when the shot is completed. This can cause problems because the clubs are sometimes inadvertently left behind on the ground when the golfer completes playing the hole and returns to the golf car.

When this happens it can be difficult to find the golf clubs inadvertently left behind. Sometimes the clubs may be left in tall grass making them more difficult to find later when it is determined that they are missing. The same problem can occur when playing from the fairway when the golfer utilizes a selection of clubs and leaves another club, such as a short iron, in the approaches or fringes of the green. Placing unused golf clubs on the ground also exposes them to moisture and dirt thereby requiring the golfer to clean them before they can be used.

While no statistics are believed to be available on this problem, it is believed that many golfers who use golf cars have inadvertently left a golf club somewhere on a golf course in this manner. Many golfers have made this same mistake more than once. Therefore it is desirable to find a way to prevent the accidental loss of golf clubs in this manner. Additionally, it is desirable to make the carrying of a number of golf clubs away from golf cars more convenient for golfers.

Small hand carried golf club holders suitable for this purpose have been known and used for many years. Some of the known golf club holder devices provide a blade or spike protruding from one end of the holder. To use these club holder devices the golfer forces the blade or spike into the ground to support the club holder in an upright position while making a shot.

An early example of such a device is taught in U.S. Pat. No. 699,391 issued May 6, 1902, to Johnson. In the Johnson golf club holder the golf club shafts are retained at the top and bottom portions of the holder by laterally projecting discs and sockets. U.S. Pat. No. 2,577,333, issued Dec. 4, 1951, to Klum et al. also discloses retaining members at the top and bottom portions of the holder wherein the retaining members project outwardly to retain the club shafts. U.S. Pat. No. 2,716,432, issued Aug. 30, 1955, to Duffy teaches retaining the club shafts only at the top portion of the club holder. The club holder taught by Duffy is held upright by a laterally projecting spike.

U.S. Pat. No. 2,858,868, issued Nov. 4, 1958, teaches a rigid, laterally projecting retaining member positioned toward the top of the club holder for retaining the golf clubs. The head portions of the golf clubs are retained by a flexible strap which encircles the golf club shafts in this device. U.S. Pat. No. 2,887,137, issued May 19, 1959 to Robb discloses a laterally projecting slotted retainer to hold the grip portions of the golf clubs.

U.S. Pat. No. 5,080,239, issued Jan. 14, 1992 to Rowland teaches a golf club holder which is particularly adapted for use with golf cars. The Rowland device provides an elongated rigid body terminating at one end as a spike.

The spike termination is driven into the ground when using the holder. The other end of the elongated body is provided with a handle for carrying the golf club holder device. A plurality of elongated flexible retaining members is fixed at one of their ends to the body. The other ends of the retaining members are affixed to a ring or other securing device which is effective to grasp a golf club shaft. When no golf clubs are retained in this golf club holder device, it can be conveniently inserted into a golf bag and carried along with a number of golf clubs.

It is also known to provide add on devices for conveniently carrying small golf accessories or other objects along with golf bags. For example, U.S. Pat. No. 5,096,059, issued Mar. 17, 1992 to Henderson teaches an accessory saddle member for a golf bag. The accessory saddle member includes a number of closeable pockets for carrying golf related items and personal items. It is also provided with straps for securing the saddle member to the golf car. The saddle member taught by Henderson can be detachably secured to a golf bag using a hook and loop fabric fastener strip when the golf bag is received into an aperture in the saddle member.

U.S. Pat. No. 5,269,410, issued Dec. 14, 1993, to Abregano teaches a golf accessory organizer. The golf accessory organizer taught by Abregano is adapted to hold a number of small accessories such as tees, divot fixers and ball markers. A spring clip is provided on the Abregano accessory organizer for releasably securing the accessory organizer to a golf bag. However, neither the accessory saddle member taught by Henderson nor the accessory organizer taught by Abregano is suitable for holding and carrying a plurality of golf clubs.

A solution to the problem of transporting golf clubs while away from a golf car was taught in U.S. Pat. No. 5,472,084 issued to Joseph F. Aliano, Jr. on Dec. 5, 1995. The riding golf car taught by Aliano has an attachment bar or other attachment means for attaching the golf bag to the back of a golf car. The Aliano golf club bag has two golf bag portions. Each golf bag portion has an opening at the top for receiving at least one golf club and an elongated body portion for retaining the shafts and grips of the golf clubs. The two golf bag portions are separate and a bag attachment device is provided for securely and detachably attaching the two golf bag portions to each other. One of the golf bag portions is attached to the golf car in order to secure it while it is transported by the golf car. The other golf bag portion is attached to the golf bag portion that is secured to the golf car. When the two golf bag portions are detached from each other, each can be carried separately by its own carrying strap while retaining its own golf clubs. However, securing the golf bag taught by Aliano to a golf bag attachment device can still be awkward.

SUMMARY OF THE INVENTION

A golf bag attachment system for transporting golf clubs is taught. The golf bag system uses a golf car having an attachment strap to secure the golf bag to the golf car. The attachment system includes a strap attachment device coupled to the golf bag for receiving and forcibly retaining the attachment strap to secure the golf bag to the golf car. A further strap is provided along with a further strap attachment for attaching the further strap to the golf bag and carrying the golf bag with the further strap. The attachment device includes a tightening device for detachably securing the attachment strap to the attachment device. The tightening device can be rotatable and can be rotatably advanced toward the attachment strap. The tightening device thus forcibly retains the attachment strap by pressing the attachment strap against the golf bag. Additionally, the tightening device can compressibly secure the attachment strap. The tightening device can be a wedge which can be a pivotable wedge. The attachment device can also be a lever, a set screw, or a push in clamp. The attachment device can include an attachment encasement for passing the attachment strap therethrough.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7A is a front elevational view of an alternate embodiment of the small golf bag portion as show in FIG. 2A;

FIG. 7B is a side elevational view of the alternate embodiment of the small golf bag portion as shown in FIG. 7A;

DETAILED DESCRIPTION OF PREFERRED EMBODIMENTS

Figure 1A:
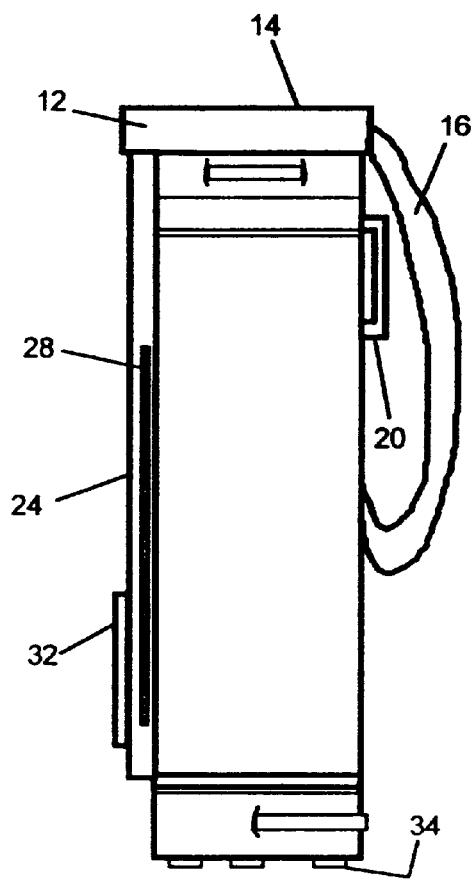
FIG. 1A is a side elevational view of the large golf bag portion of the piggyback golf bag system.
Figure 1B:
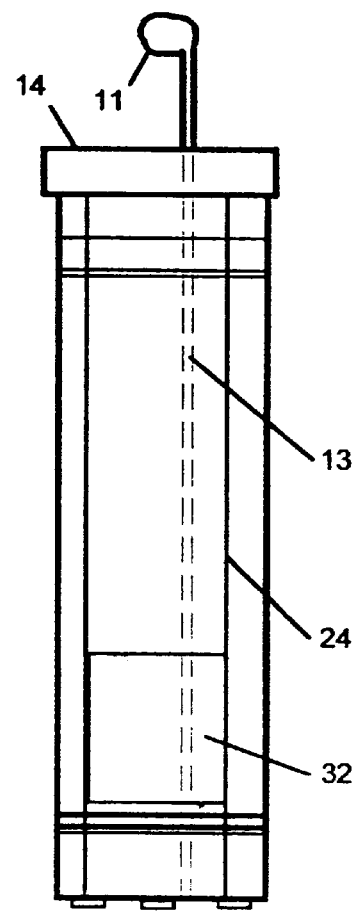
FIG. 1B is a front elevational view of the large golf bag portion of the piggyback golf bag system as shown in FIG. 1A.
Figure 1C:
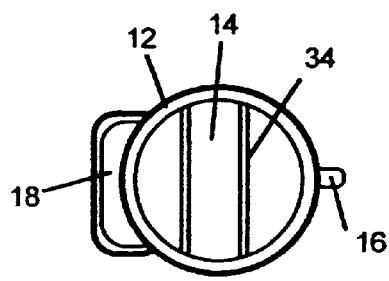
FIG. 1C is a top plan view of the large golf bag portion of the piggyback golf bag system as shown in FIG. 1A.
Figure 1D:
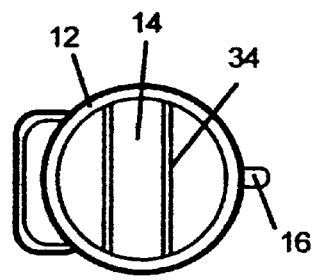
FIG. 1D is a top plan view of an alternate embodiment of the large golf bag portion of the piggyback golf bag system shown in FIG. 1A.

Referring to the drawings, wherein the same reference numerals are used to designate the same elements throughout, there is shown in FIGS. 1A–1D the large golf bag portion 10. The large golf bag portion 10 has a receiving opening 14 at the top for receiving a golf club 11 and an elongated golf bag portion 24 for retaining the elongated shaft 13 of the golf club 11. A number of golf club dividers 34 can be provided within the large golf bag portion 10 in order to separate and organize golf clubs such as the golf club 11 when a number of them are disposed therein. In this manner a number of golf clubs 11 can be organized and retained within the golf bag portion 10. Golf bag portion 10 at 14 is also fitted with a lip or protruding portion made to receive the hook or hanging device of second bag for the purpose of joining the two bags. A carrier shoulder strap 16 is provided in order to permit convenient carrying of the large golf bag portion 10 and golf clubs 11.

The large golf bag portion 10 is also provided with securing device 32 for releasably securing an object to the large golf bag portion 10. The securing device 32 is attached to the outer surface of the large golf bag portion 10. The preferred location of the securing device 32 is the front side at the bottom of the elongated body 24 of the golf bag portion 10, opposite the carrier shoulder strap 16.

In the preferred embodiment of the piggyback golf bag system the securing device 32 can be a pressure sensitive securing device such as one of conventional hook and loop material. A common example of this type of pressure sensitive securing device is hook and loop fastener. However, it will be understood that the securing device 32 can be any convenient device for conveniently securing and releasing an object to the large golf bag portion 10 of the present invention within the scope of the present invention as described hereinbelow.

In addition to the securing device 32 and the shoulder strap 16, the large golf bag portion 10 can be provided with any of the normal features of a conventional golf bag. These features can include, but are not limited to, a zipper pocket 28, a handle 20 and a plurality of feet 34 for permitting the large golf bag portion 10 to stand in an upright position.

A mating lip 12 having an opening 18 is also provided on the large golf bag portion 10 for detachably mating the large golf bag portion 10 to form a piggyback golf bag system in a manner described hereinbelow. In the preferred embodiment of the large golf bag portion the mating lip 12 is located on the front of the large golf bag portion toward the top of the elongated portion 24. Most preferably the mating lip 12 is located in the vicinity of the receiving opening 14.

Figure 2A:
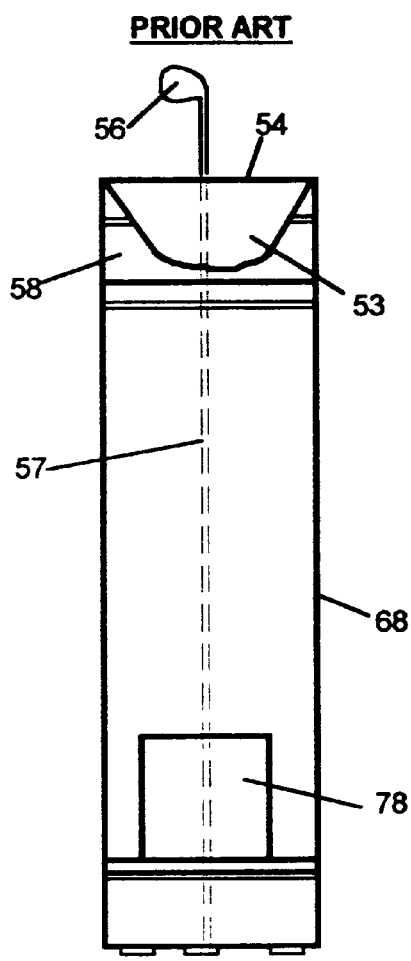
FIG. 2A is a front elevational view of the small golf bag portion of the piggyback golf bag system.
Figure 2B:
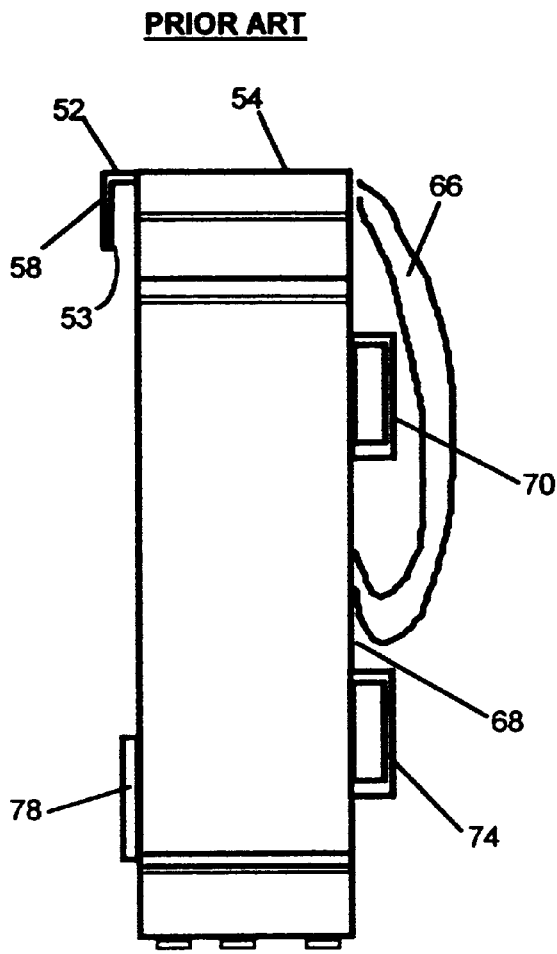
FIG. 2B is a side elevational view of the small golf bag portion of the piggyback golf bag system as shown in FIG. 2A.
Figure 2C:
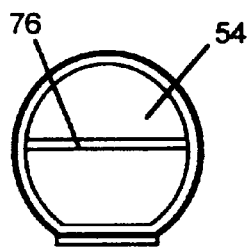
FIG. 2C is a top plan view of the small golf bag portion of the piggyback golf bag system as shown in FIG. 2A.

Referring to FIGS. 2A–2C, there is shown the small golf bag portion 50. The small golf bag portion 50 is provided with a receiving opening 54 for receiving one or more golf clubs 56 and an elongated body portion 68 for retaining the elongated shaft 57 of the golf club 56. On the rear side of the small golf bag portion 50 a shoulder carrying strap 66, an upper handle 70 and a lower handle 74 are provided in order to permit the small golf bag portion 50 to be conveniently carried and handled while it contains a number of golf clubs such as the golf club 56. A golf club divider 76 can be provided within the small bag portion 50 or bag portion 50 in order to separate and organize a number of golf clubs such as the golf club 56.

A mating hook 58 is disposed on the front side of the small golf bag portion 50, opposite the shoulder strap 66 and the handles 70, 74. The mating hook 58 has a laterally extending segment 52 secured at one end to the elongated body portion 68 of the golf bag portion 50. A downwardly extending segment 53 depends from the opposite end of the laterally extending segment 52 and is formed with a triangular shape in the preferred embodiment. The mating hook 58 is preferably located toward the top of the elongated body portion 68 of the small golf bag portion 50. Most preferably the mating hook 58 is located in the vicinity of the receiving opening 54 at the top the small golf bag portion 50.

A releasably securing device 78 is disposed on and securely attached to the small golf bag portion 50, preferably on the front side. Thus the mating hook 58 and the securing device 78 are preferably disposed on the same side of the small golf bag portion 50 as each other and on the side opposite the shoulder carrying strap 66. The securing device 78 is preferably a pressure sensitive securing device of the type previously described with respect to the releasably securing device 32.

Figure 3:
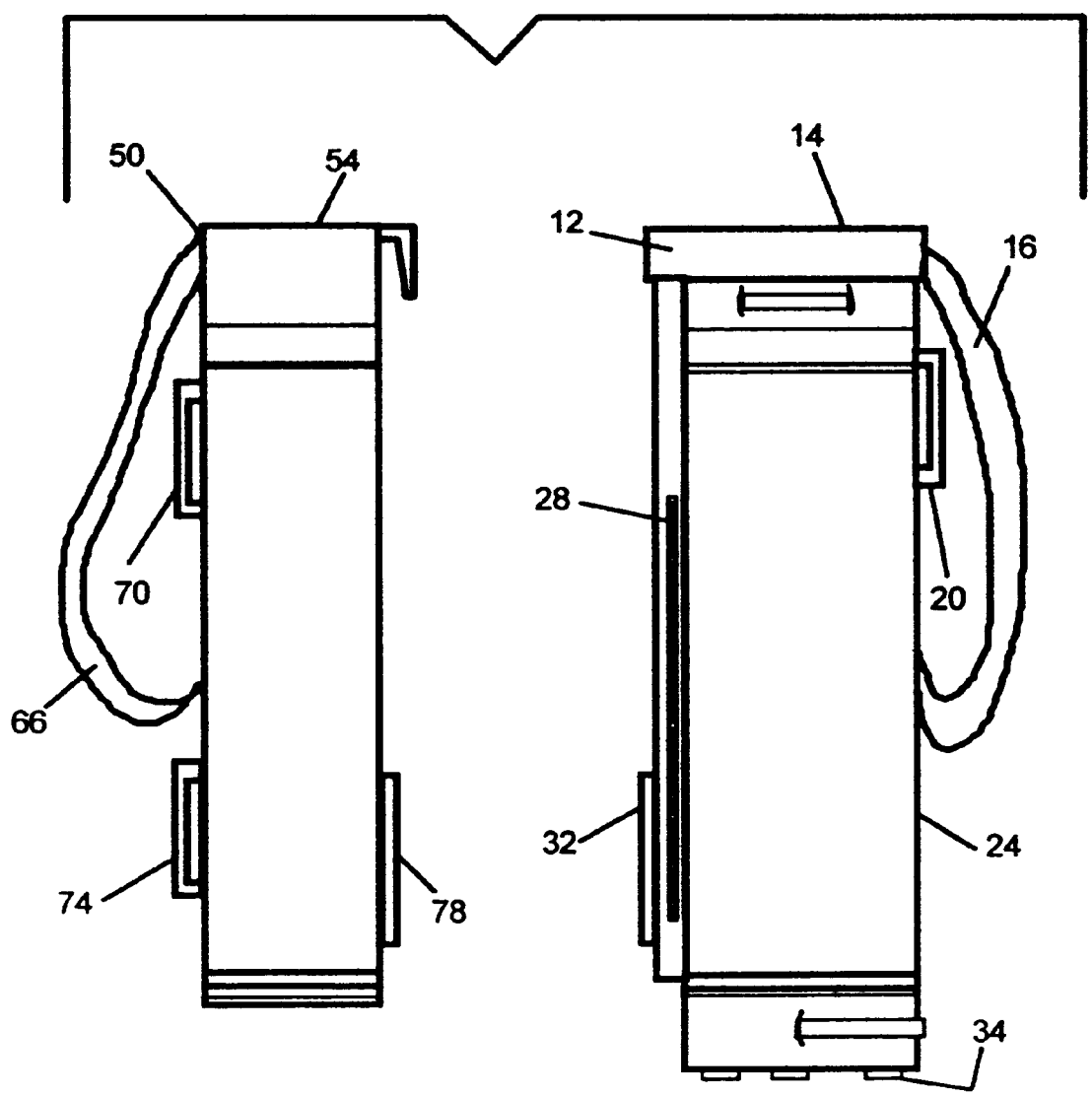
FIG. 3 is a side elevational view of the large golf bag portion of FIG. 1A and the small golf bag portion of FIG. 2A about to be joined together to form the piggyback golf bag system.

Referring to FIG. 3, there is shown the piggyback golf bag system 80. The piggyback golf bag system 80 includes the large golf bag portion 10 and the small golf bag portion 50 releasably coupled to each other. The large golf bag portion 10 and the small golf bag portion 50 are releasably secured to each other in the piggyback golf bag system 80 in order to permit them to be conveniently transported together and conveniently separated when the small golf bag portion 50 is to be used to carry golf clubs to a location distant from the large golf bag portion 10 and golf car.

In order to mate and releasably secure the golf bag portions 10, 50 to each other they are positioned with the fronts of the two golf bag portions 10, 50 facing each other. Using the handles 70, 74 of the small golf bag portion 50, the small golf bag portion is maneuvered to downwardly insert the tip of the downwardly extending segment 53 of the mating hook 58 into the opening 18 of the mating lip 12 of the large golf bag portion 10. The downwardly extending segment 53 is then moved in a downward direction through the opening 18 until the laterally extending segment 52 of the mating hook 58 rests against the mating lip 12.

When the mating hook 58 of the small golf bag portion 50 is mated with the mating lip 12 of the large golf bag portion 10 in this manner, the golf bag portions 10, 50 can be rotated with respect to each other about a pivot formed by the mating hook 58 and the mating lip 12. In this manner the small golf bag portion 50 can be pivoted toward the large golf bag portion 10 to bring the lower regions of the fronts of the golf bag portions 10, 50 into contact with each other. In the preferred embodiment of the piggyback golf bag system 80 the securing devices 32, 78 are disposed on the fronts of the golf bag portions 10, 50 at locations such that the pivoting action brings them into contact with each other whereby they can be releasably secured to each other.

In order to perform the mating operation, the handles 70, 74 of the small golf bag portion 50 can first be separately grasped, one in each hand, to lift the small golf bag portion 50 and maneuver the tip of the downwardly extending segment 53 to the opening 18 of the mating lip 12 for insertion therethrough. It will be understood that the weight of the small golf bag portion 50 and its contents must be supported during the positioning process. Therefore, in order to facilitate this insertion, the opening of the mating lip 12 should be wide enough to permit easy insertion of the downwardly extending segment 53 without an undue amount of care about the positioning of the tip of the downwardly extending segment 53. Also, the hook 53 should be a triangular shape to facilitate insertion.

When the mating hook 58 and the mating lip 12 are joined in this manner the small golf bag portion 50 is pivoted as previously described or held away at the bottom by the lower handle. This pivoting is primarily under the control the lower handle 74 of small bag portion 50. However, before and during pivoting the bottom of the small bag portion can be held away from the large bag portion 10 by the lower handle 74 or by the user's hand. After the pivoting is complete to bring the securing device 78 of the small golf bag portion 50 into contact with the releasably securing device 32 of the large caddie bag portion 10, the golf bag portions 10, 50 can be simultaneously supported upon the feet 34 of the large golf bag portion 10. Additionally, the golf bag portions 10, 50 can be transported in a mated configuration by a golf car 200 (FIG. 8) while the large golf bag portion 10 is secured to the rear of the golf car 200 by a golf car attachment device 210 as shown in FIG. 8. Golf car attachment device 210 can include a strap or any other conventional device for securing a golf bag 10 to the rear of a golf car 200. Furthermore, it will be understood that golf cars include any such vehicles, including golf carts and riding carts.

Figure 4A:
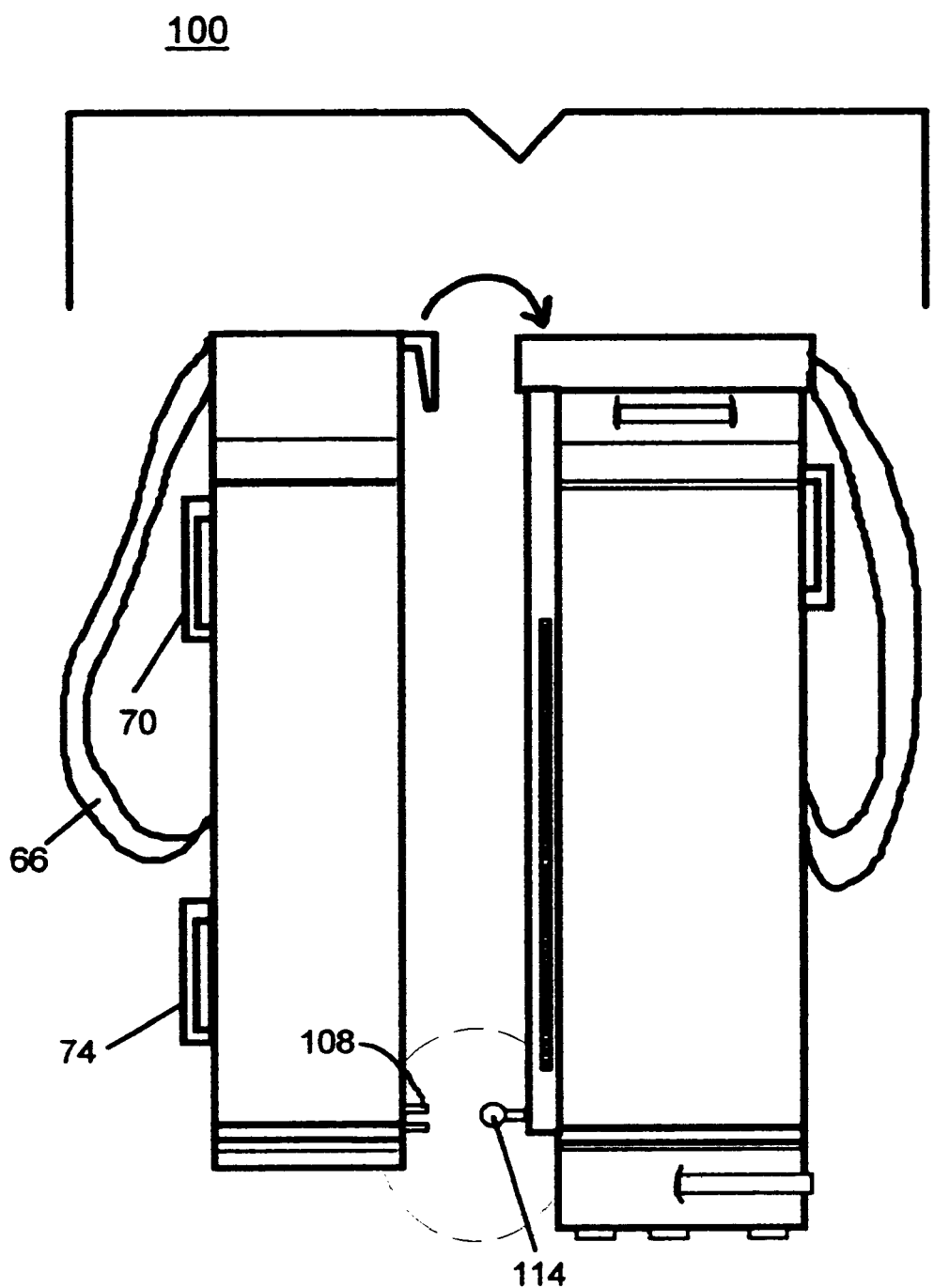
FIGS. 4A, 4B are side elevational views of an alternate embodiment of the piggyback golf bag system as shown in FIG. 3.
Figure 4B:
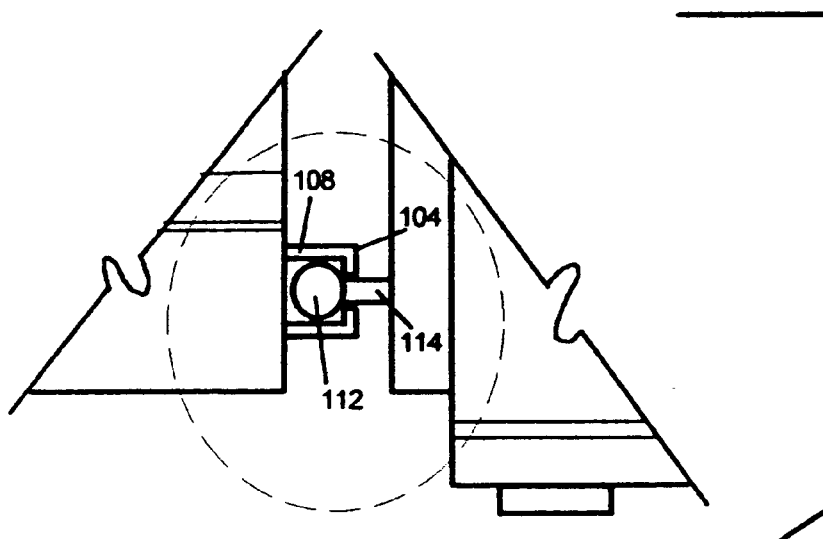
Figure 4B:
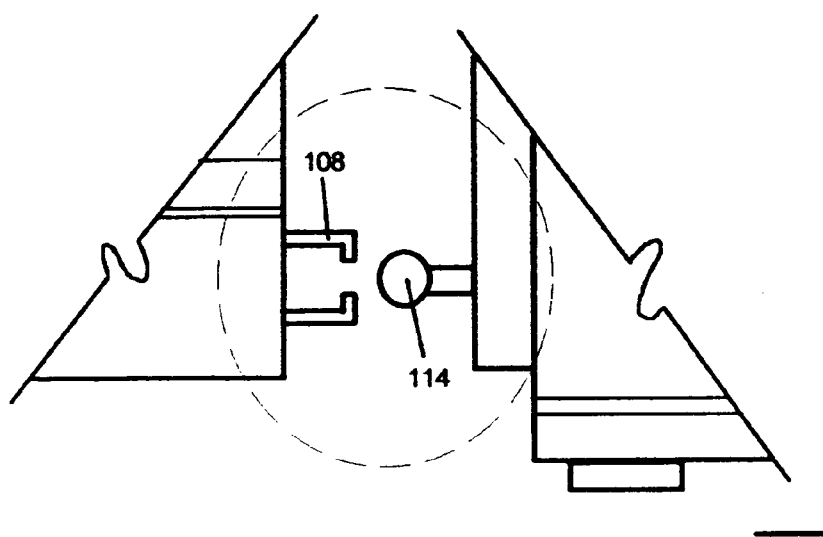

Referring to FIGS. 4A, B, there is shown the piggyback golf bag system 100. The piggyback golf bag system 100 is an alternate embodiment of the piggyback golf bag system 80. In addition to the mating hook 58 and the mating lip 12 as previously described, an attachment device 104 rather than the releasably securing devices 32, 78, is provided in the golf bag system 100 for detachably securing the large golf bag portion 10 to the small golf bag portion 50.

The attachment device 104 of the piggyback golf bag system 100 includes a conventional spring latch wherein spaced apart outwardly extending resilient arms 108 are resiliently spread apart from each other by a ball 112 as a rod 114 thrusts the ball 112 into the space between the arms 108. Thus, within the piggyback golf bag system 100 the handles 70, 74 are grasped to insert the downwardly extending segment 53 of the mating hook 58 into the opening 18 of the mating lip 12 until the laterally extending segment 52 rests against the mating lip 12 as previously described. Then, primarily using the handle 74, the small golf bag portion 50 is pivoted to thrust the ball 112 of the attachment device 104 between the resilient arms 108 until the arms 108 resiliently spring back and secure the ball 112 and supporting rod 114.

Figure 5A:
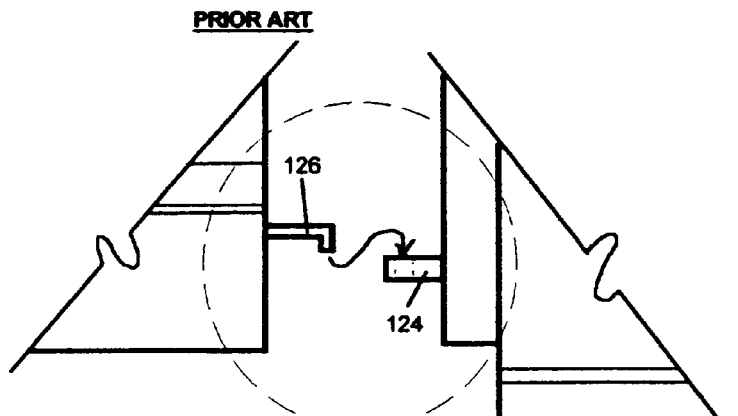
FIGS. 5A–5C are fragmentary views of an alternate embodiment of the piggyback golf bag system as shown in FIG. 3.
Figure 5B:
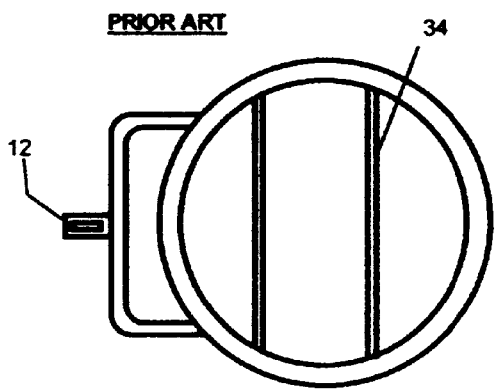
Figure 5C:
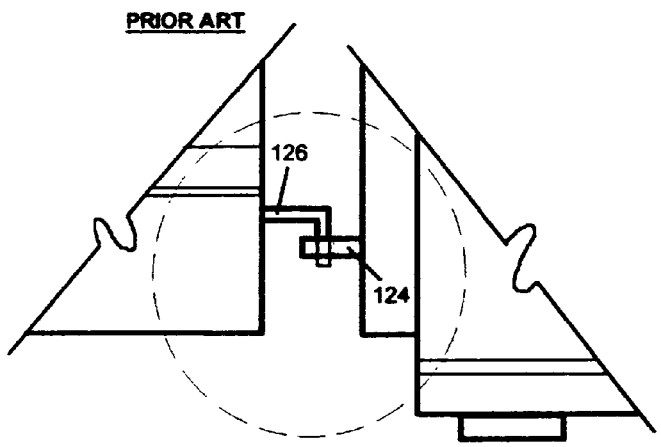

Referring to FIGS. 5A–C, there is shown a further attachment device 120. The attachment device 120 is an alternate embodiment of the pressure sensitive attachment devices 32, 78 and the attachment device 104 for use in detachably securing the large golf bag portion 10 and the small golf bag portion 50 to each other within the piggyback golf bag system. The attachment device 120 is a conventional hook and eyelet system, wherein an eyelet 124 is disposed on the front surface of the large golf bag portion 50 and a downwardly extending hook 126 is disposed on the small golf bag portion 50.

When detachably securing the small golf bag portion 50 to the large golf bag portion 10 using the hook and eyelet attachment device 120, the handles 70,74 are grasped and the tip of the downwardly extending segment 53 of the mating hook 58 is moved to the vicinity of the opening 18 of the mating lip 12 on the large golf bag portion 10. The small golf bag portion 50 is then lowered to permit the downwardly extending segment 53 to move through the opening 18 of the mating lip 12 until the tip of the hook 126 is in the vicinity of the eyelet 124. The small golf bag portion 50 is then maneuvered using handles 70, 74 to cause the hook 126 to mate with the eyelet 124.

While a limited number of latching, hooking and adhering methods are shown herein for securing the upper and lower regions of the small golf bag portion 50 and the large golf bag portion 10 to each other, it will be understood that any method for detachably securing them is believed to be within the scope of the invention and a matter of design choice. Other methods for mating the top and bottom regions of the golf bag portions 10, 50 can include, but are not limited to wrap around straps having buckles and straps having hook and loop material at the top as well as at the bottom. Additionally, any type of clamping device can be used. When the securing golf bag portions 10, 50 are joined to each other to form the piggyback golf bag system, the male and female elements forming the various releasable attachment devices can be disposed on either golf bag portion 10, 50 and at varying locations along the elongated regions 24, 68 of the golf bag portions 10, 50.

Figure 6A:
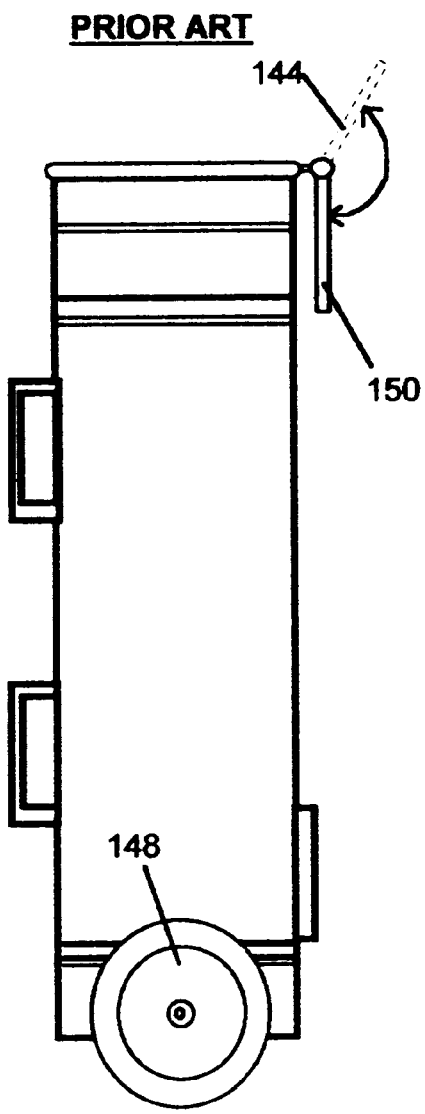
FIG. 6A is a side elevational view of an alternate embodiment of the small golf bag portion as shown in FIG. 2A.
Figure 6B:
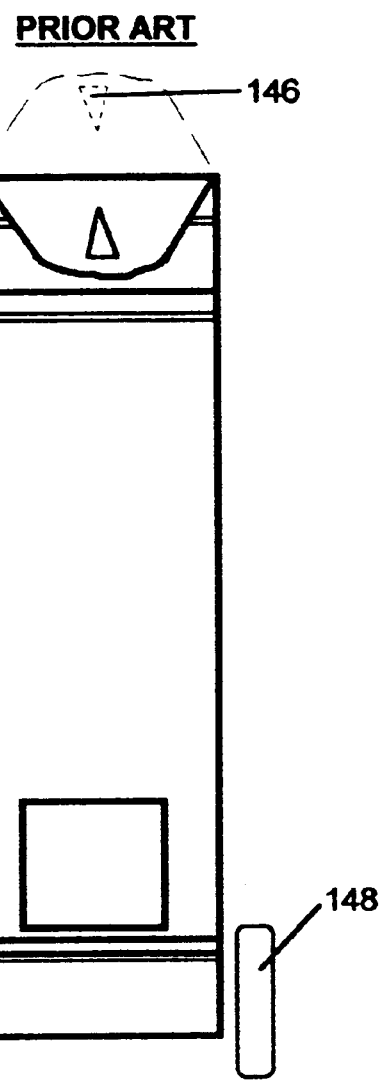
FIG. 6B is a front elevational view of the alternate embodiment of the small golf bag portion as shown in FIG. 6A.

Referring to FIGS. 6A, B, there is shown a small golf bag portion 140. The small golf bag portion 140 is an alternate embodiment of the small golf bag portion 50. The small golf bag portion 140 is provided with an articulating hook 144. In the articulating hook 144 of the small bag portion 140, a rotatable segment 150 is hinged with respect to an outwardly extending top segment 52. When the rotatable segment 150 is rotated into its downward mating position, it is disposed for mating with the opening 18 of the mating lip 12 as previously described. When the rotating segment 150 is rotated to its upward position (shown in phantom), it can be grasped through an opening 146 to pull the small golf bag portion 140 along a surface using the wheels 148 on the lower region of the small golf bag portion 140 in order to conveniently transport the small golf bag portion 140.

Figure 7C:
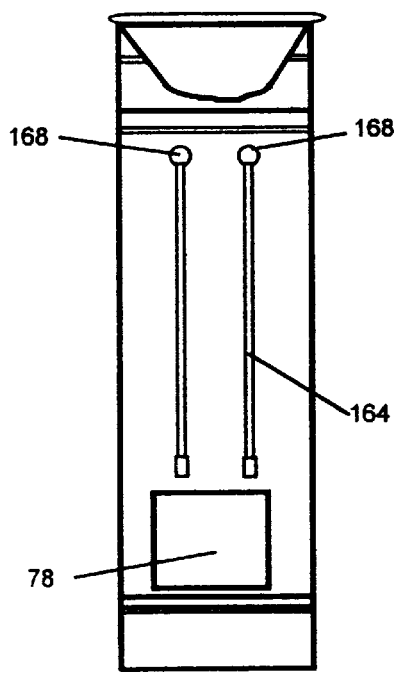
FIG. 7C is a side elevational view of the alternate embodiment the small bag portion as shown in FIG. 7A disposed in a swing-out position.
Figure 7C:
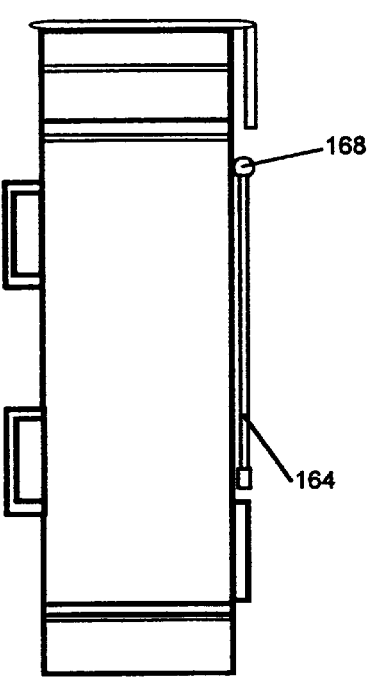
Figure 7C:
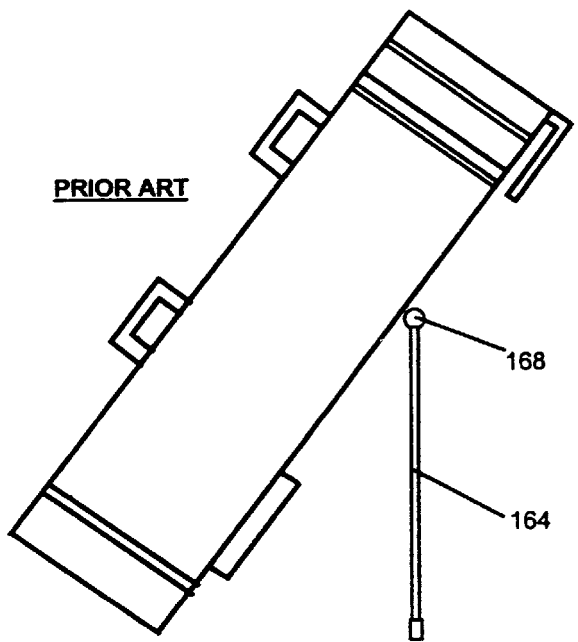
Figure 8A:
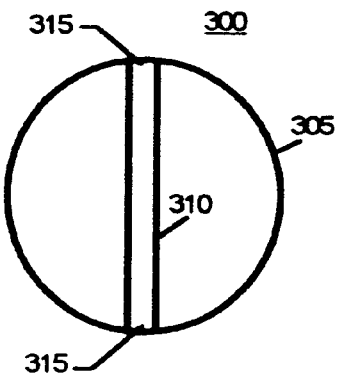
FIGS. 8A–E are views of the system for attaching a golf bag to a golf car of the present invention.
Figure 8B:
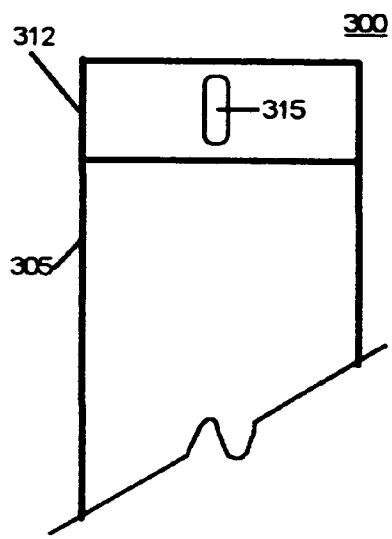
Figure 8C:
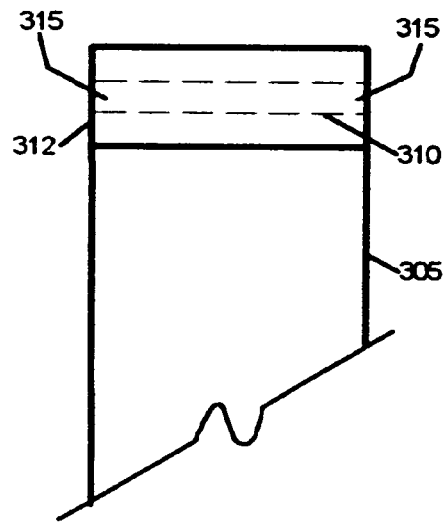
Figure 8D:
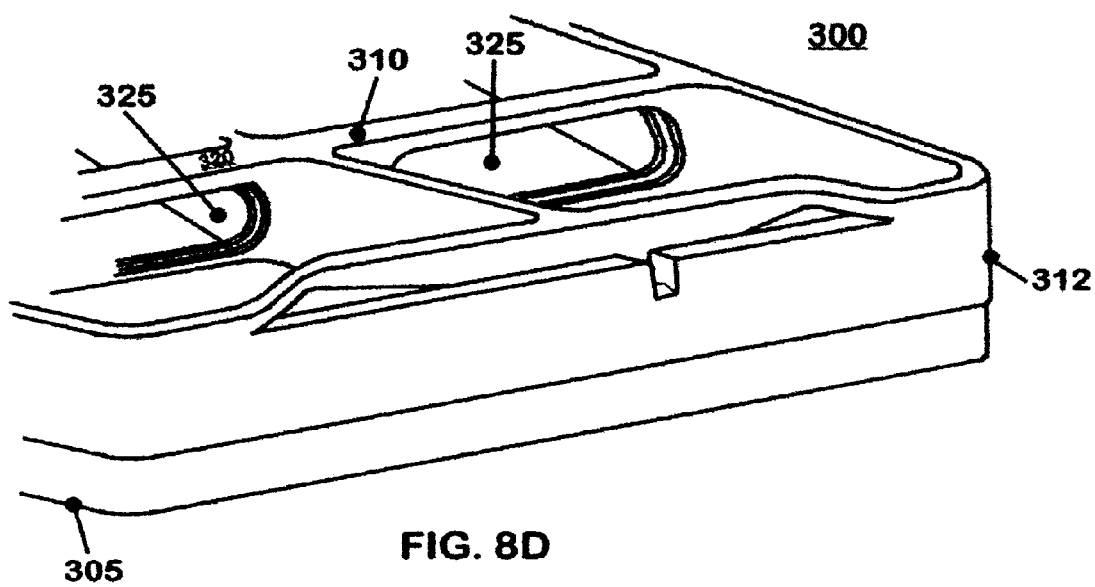
Figure 8E:
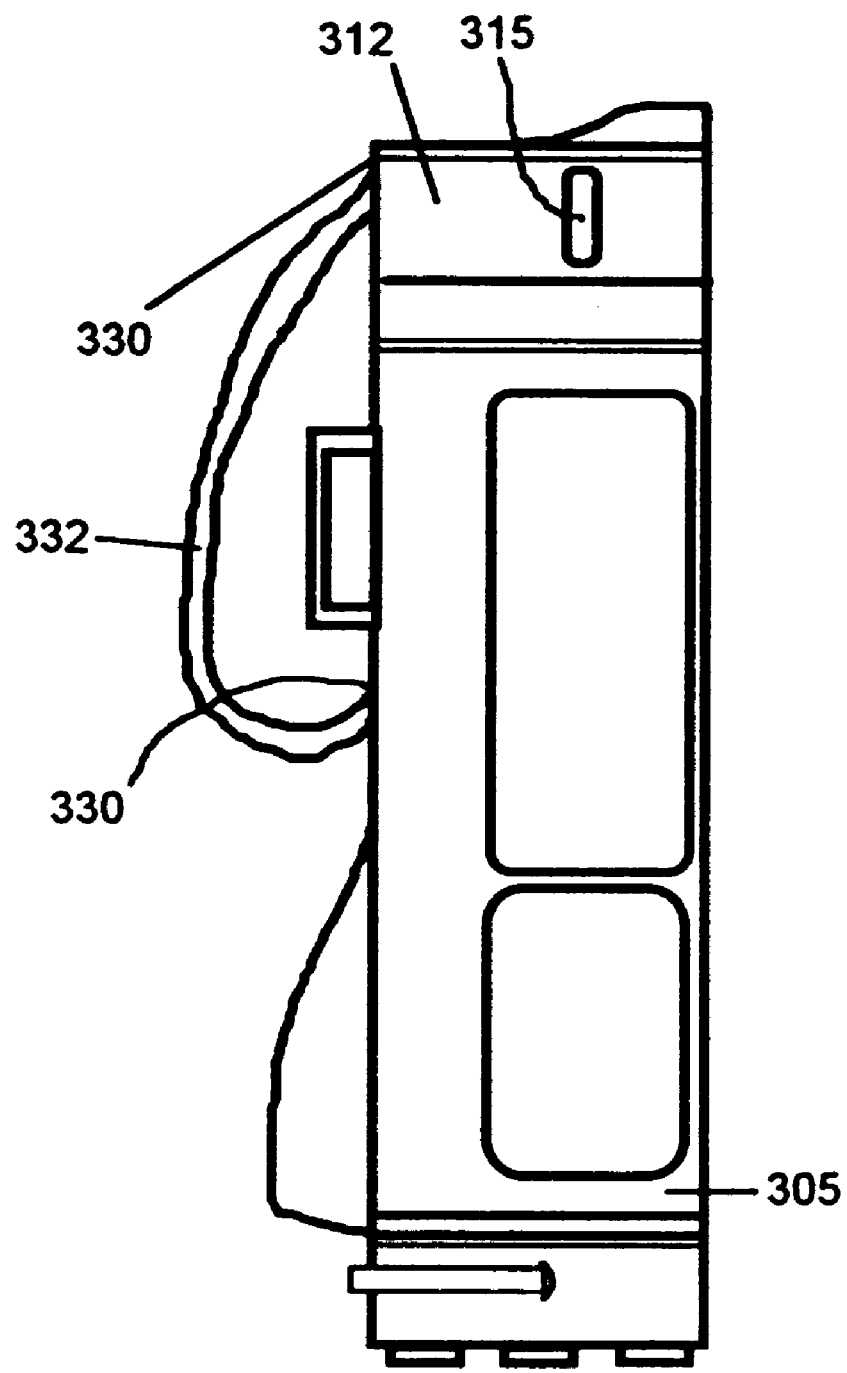
Figure 8F:
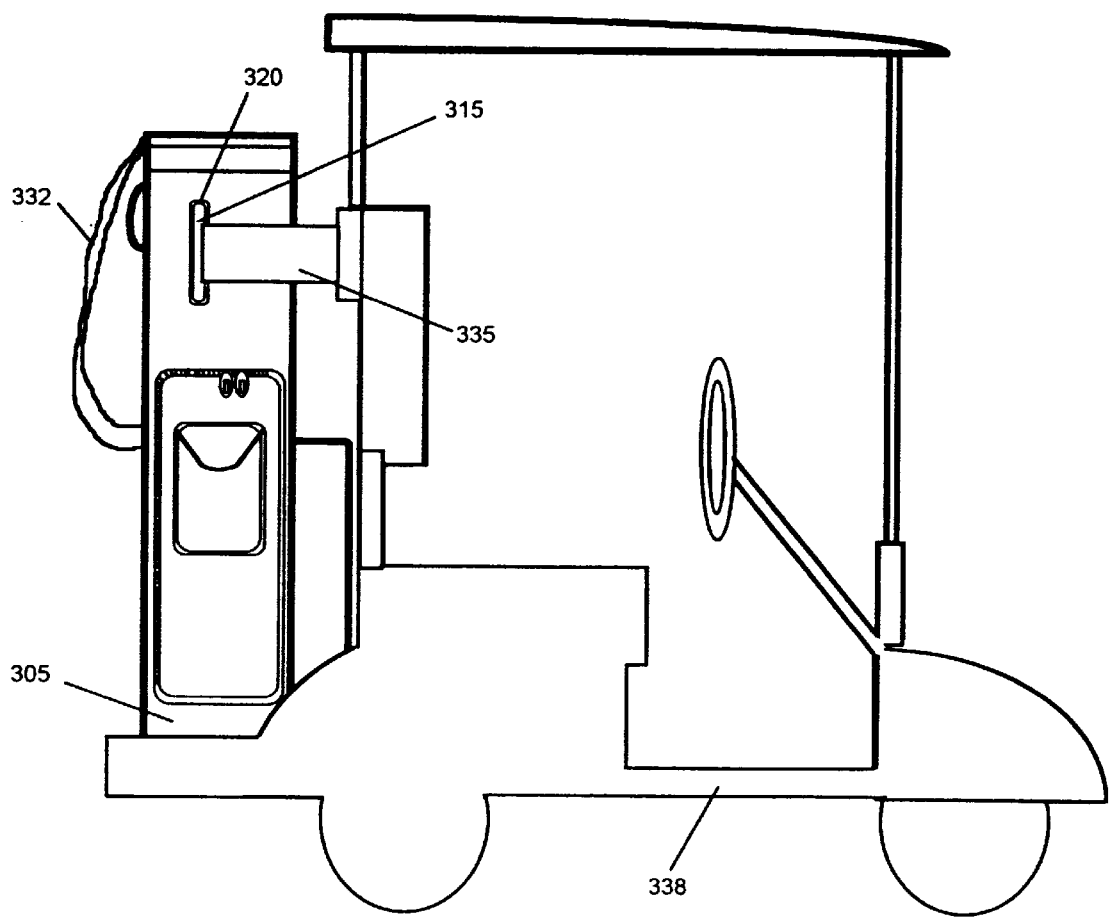
FIG. 8F is a view of the system for attaching a golf bag of the present invention coupled to a golf car.

Referring to FIGS. 7A–7C, there is shown a small golf bag portion 160. The small golf bag portion 160 is a further alternate embodiment of the small golf bag portion 50. Within the small golf bag portion 160 a number of tripod legs 164 are pivotally secured to the elongated portion 68 by hinges 168. The small golf bag portion 160 can be transported, while containing the golf club 56, in the manner previously described or by any other convenient method. When the small golf bag portion 160 is no longer being transported, for example when a user is hitting a ball, the tripod legs 164 can be rotatably extended to provide a support means for holding the small golf bag portion 160 in a semiupright position.

In FIGS. 8A–F there is shown golf bag attachment system 300 for detachably securing golf bag 305 to golf car 338 as well as a view of system 300 coupled to a golf car 338. Golf bag attachment system 300 includes golf bag 305 having rim 312 and attachment conduit 310 therethrough. Attachment conduit 310 can pass through the forward region of golf bag 305, the rearward region of golf bag 305, or a region toward the center. Additionally, attachment conduit 310 can pass through golf bag 305 at the height of rim 312 or through any height of golf bag 305 below rim 312.

Attachment conduit 310 is adapted for receiving golf car attachment strap 335 to detachably secure golf bag 305 to golf car attachment structure 350 of golf car 338. Golf car attachment strap 335 is inserted into the interior of attachment conduit 310 and passed from the interior of attachment conduit 310 by way of conduit openings 315 at opposite ends of attachment conduit 310. Golf car attachment strap 335 can be a conventional strap attached to any conventional golf car attachment structure 350 and buckled thereto in a conventional manner. It will be understood that any other method of securing golf car attachment strap 335 to golf car attachment structure 350 and thereby to golf car 338 can be used. For example, a lever closure, a hook and loop or any type of buckle can be used to secure the end of attachment strap 335 to golf car attachment structure 350.

The sidewalls of attachment conduit 310 can be provided with openings 325. Openings 325 are useful for permitting manually assisting the movement of golf car attachment strap 335 through attachment conduit 310 by permitting the fingers of the hand of the user to make contact with attachment strap 335 therethrough. Thus the user can manually guide and unblock attachment strap 335 when passing attachment strap 335 through attachment conduit 310.

Golf bag 305 is also provided with carrying strap 332 or shoulder strap 332 for permitting easy transporting of golf bag 305 when golf bag 305 is not secured to golf car 338. Shoulder strap 332 is a conventional strap, for example a hook and loop device, that can be attached to golf bag 305 in any manner. For example, shoulder strap 332 can be attached to golf bag 305 using shoulder strap attachments 330. Shoulder strap attachments 330 can fixedly attach or detachably attach shoulder strap 332 to golf bag 305 and can be located anywhere on a side of golf bag 305, for example toward the bottom or toward the top of golf bag 305. Preferably, however, upper shoulder strap attachment 330 is located near the top of golf bag 305 in the vicinity of rim 312.

It will be understood that attachment conduit 310 can pass through the interior of a partition within golf bag 305, such as partition 320. Furthermore, it will be understood that partition 320 can be used to divide the interior of golf bag 305 into regions for separating a plurality of golf clubs that can be stored in golf bag 305.

It will also be understood that golf bag attachment system 330 of the present embodiment can be advantageously applied to substantially any golf bag. For example, in addition to single golf bag 305, golf bag attachment system 300 can be applied to either golf bag portion 10, 50 of the piggyback golf bag system set forth hereinabove.

Figure 9A:
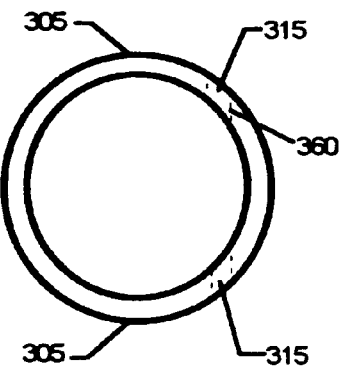
FIGS. 9A–C are an alternate embodiment of the system for attaching a golf bag of FIGS. 8A–E.
Figure 9B:
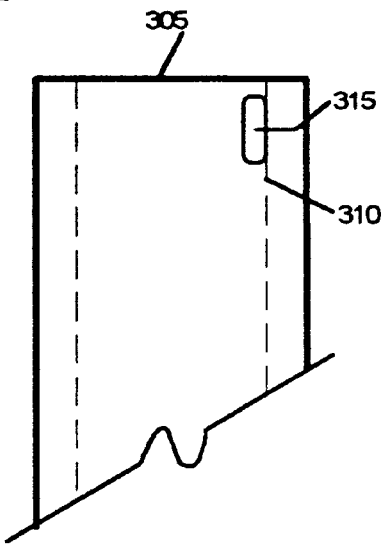
Figure 9C:
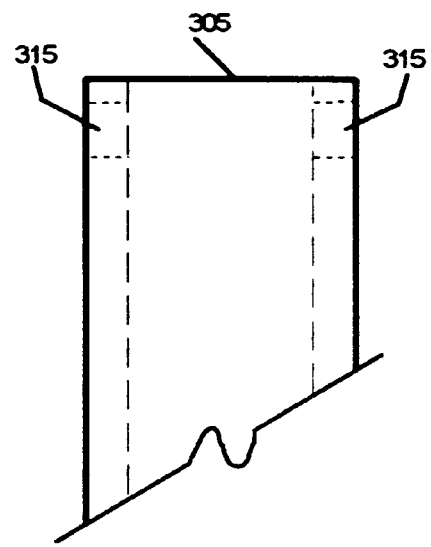
Figure 10A:
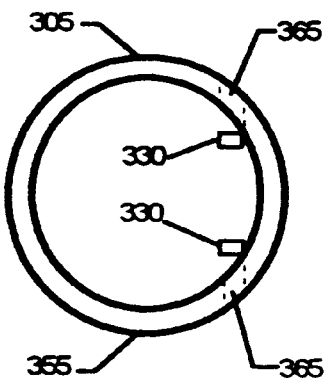
FIGS. 10A–F are alternate embodiments of the system for attaching a golf bag of FIGS. 8A–E.
Figure 10B:
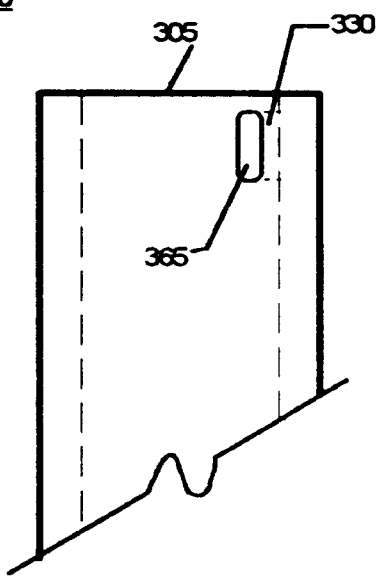
Figure 10C:
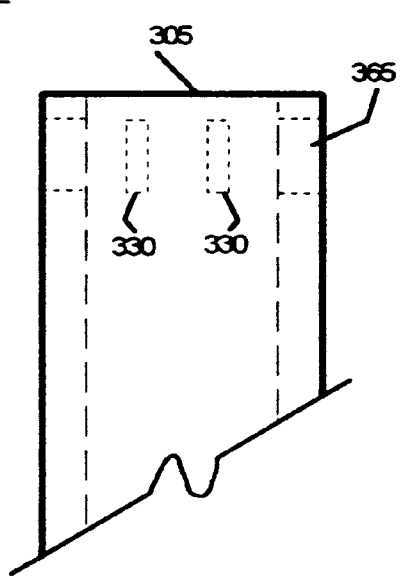
Figure 10D:
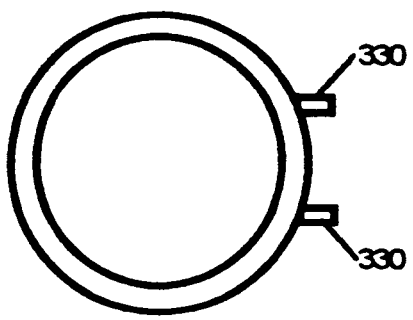
Figure 10E:
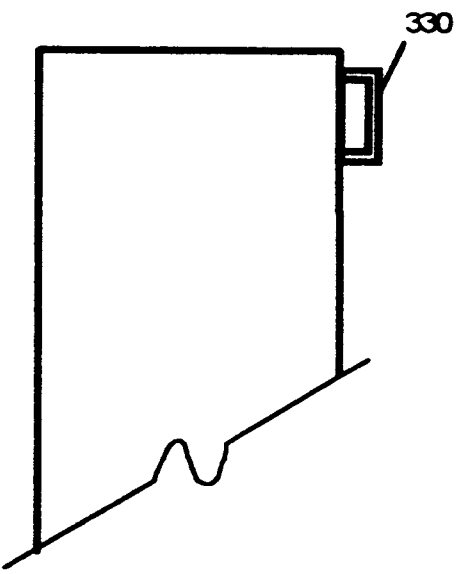
Figure 10F:
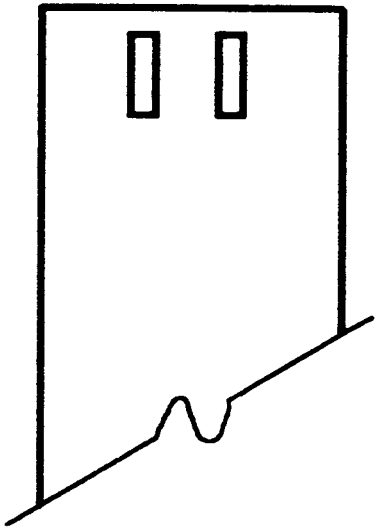
Figure 11A:
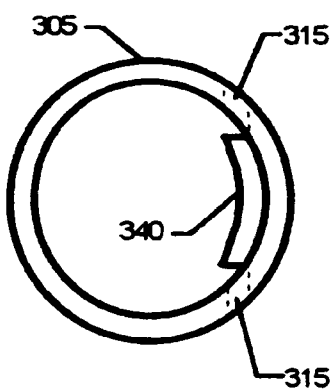
FIGS. 11A–F are alternate embodiments of the system for attaching a golf bag of FIGS. 8A–E.
Figure 11B:
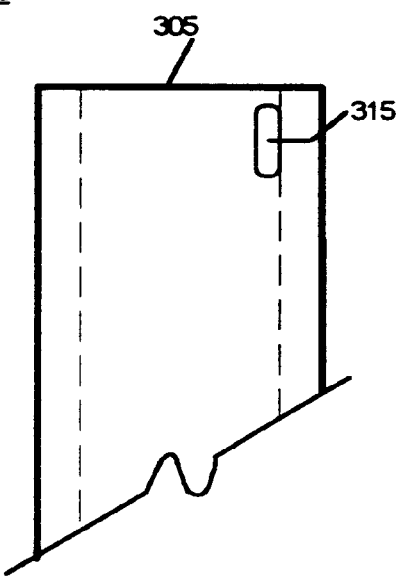
Figure 11C:
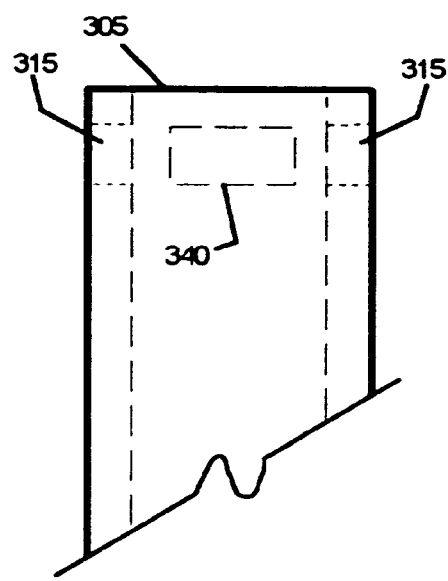
Figure 11D:
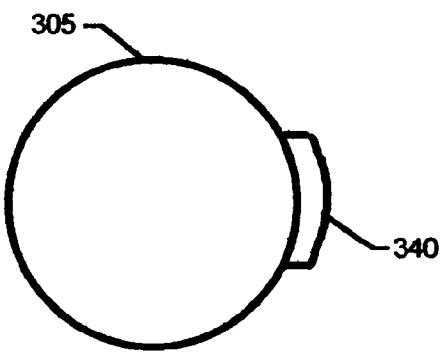
Figure 11E:
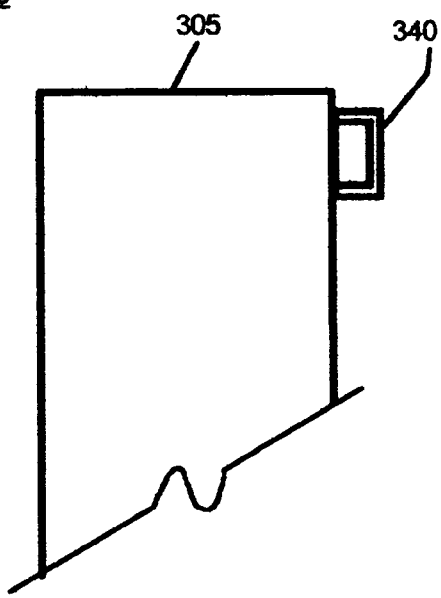
Figure 11F:
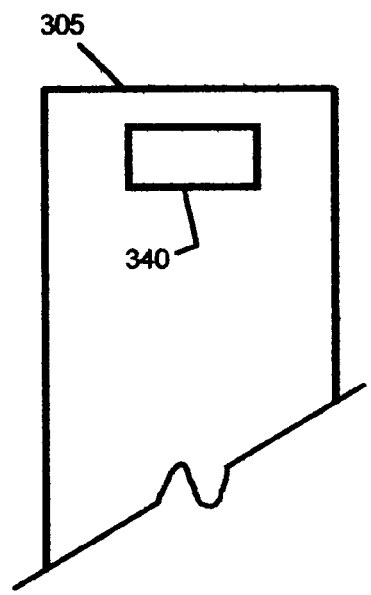

FIGS. 9A–C show golf bag attachment system 370 of the present invention. Golf bag attachment system 370 is an alternate embodiment of golf bag attachment system 300, as shown in FIGS. 8A–E. Golf bag 305 within golf bag attachment system 370 is provided with attachment conduit 360 for receiving attachment strap 335 to attach golf bag 305 to golf bag attachment structure 350 of golf car 338. Attachment conduit 360 has conduit openings 315 through the sidewall of golf bag 305 for passing attachment strap 335 therethrough when attaching golf bag 305 to attachment structure 350. Attachment strap 335 also passes through the interior region of golf bag 305 when golf bag 305 is attached to attachment structure 350. The portion of attachment strap 335 disposed within the interior region of golf bag 305 when attachment strap 335 is passed through conduit openings 315 can be completely unenclosed.

FIGS. 10A–F show golf bag attachment system 400. Golf bag attachment system 400 is also an alternate embodiment of golf bag attachment system 300 of the present invention, as shown in FIGS. 8A–E. Golf bag 305 within golf bag attachment system 400 is provided with at least one attachment loop 330 and preferably a plurality of attachment loops 330 for receiving attachment strap 335 to attach golf bag 305 to attachment structure 350 of golf car 338. Attachment loops 330 can be disposed around the outer surface or on the inner surface of golf bag 305 and can be disposed on the front, the rear, the sides or entirely around golf bag 305. When attachment loops 330 are disposed on the inner surface of golf bag 305 golf bag 305 is provided with conduit openings 365 through the sidewalls of golf bag 305 for passing attachment strap 335 therethrough when attaching golf bag 305 to attachment structure 350.

FIGS. 11A–F show golf bag attachment system 500. Golf bag attachment system 500 is an alternate embodiment of golf bag attachment system 300 of the present invention. Golf bag 305 within golf bag attachment system 500 is provided with at least one attachment encasement 340 for receiving attachment strap 335 to attach golf bag 305 to attachment structure 350 of golf car 338. If attachment encasement 340 is disposed in the inner surface of golf bag 305 attachment system 500 has conduit openings 315 through the sidewalls of golf bag 305 for passing attachment strap 335 therethrough when attaching golf bag 305 to attachment structure 350. Attachment encasement 340 can be disposed on the inner surface or the outer surface of golf bag 305 and can be disposed on the front, the rear, the sides or entirely around golf bag 305. It can also be located on a partition 320.

Attachment loops 330 and attachment encasement 340 of the present invention can be formed of plastic, cloth or any other suitable material. Thus attachment loops 330 and attachment encasement 340 can be used to secure golf bag 305 to golf car attachment device 350 of golf car 338 using attachment strap 335 in the manner previously described.

Figure 12A:
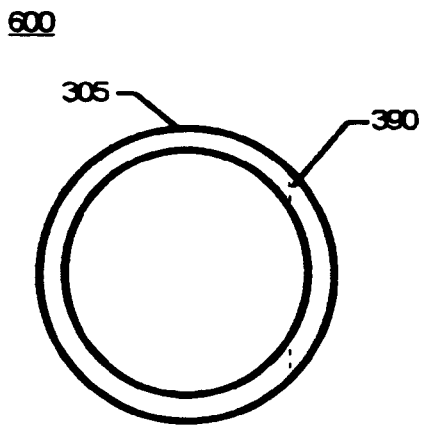
FIGS. 12A–C are an alternate embodiment of the system for attaching a golf bag of FIGS. 8A–E.
Figure 12B:
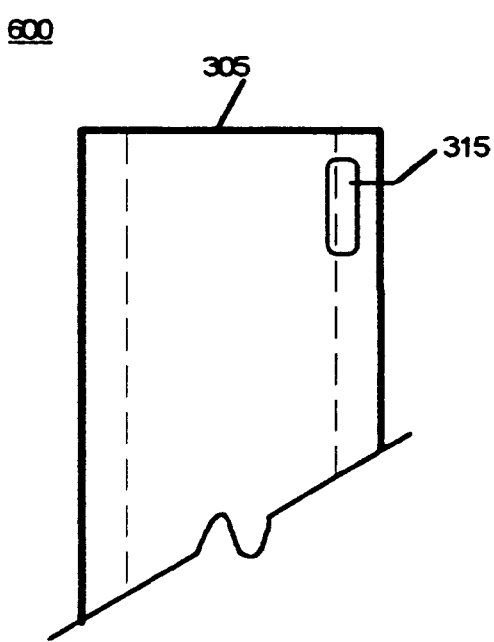
Figure 12C:
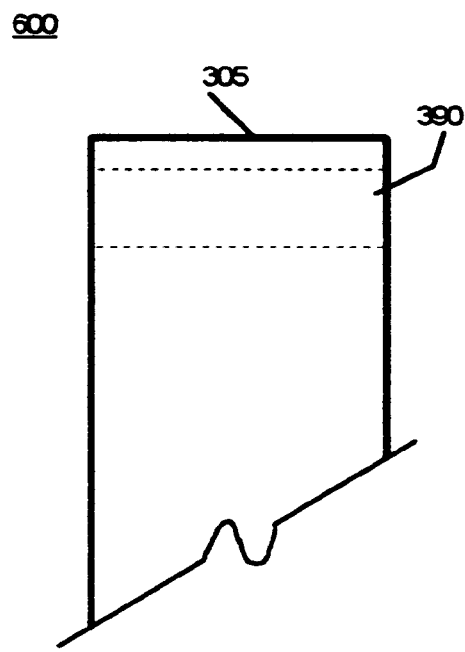

FIGS. 12A–C show golf bag attachment system 600. Golf bag attachment system 600 is an alternate embodiment of golf bag attachment system 300 of the present invention. Golf bag 305 within golf bag attachment system 600 is provided with attachment conduit 390 within a side wall of golf bag 305 for receiving attachment strap 335 to attach golf bag 305 to attachment structure 350 of golf car 338. Attachment conduit 390 is provided with conduit openings 315 through the sidewalls of golf bag 305 for passing attachment strap 335 therethrough when attaching golf bag 305 to attachment structure 350.

Figure 13A:
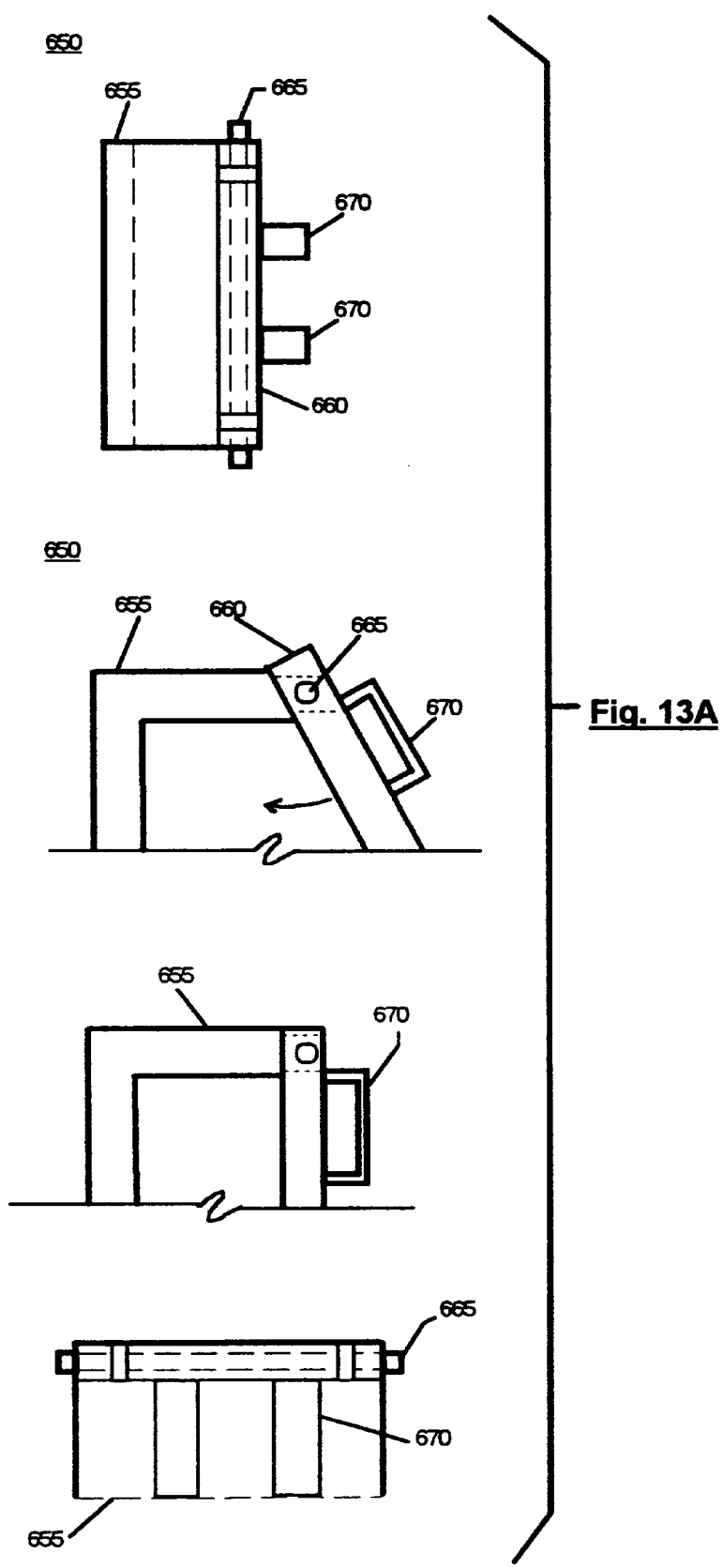
FIGS. 13A, B show an attached device which functions as an alternate embodiment of the system for attaching a golf bag of FIGS. 8A–E.
Figure 13B:
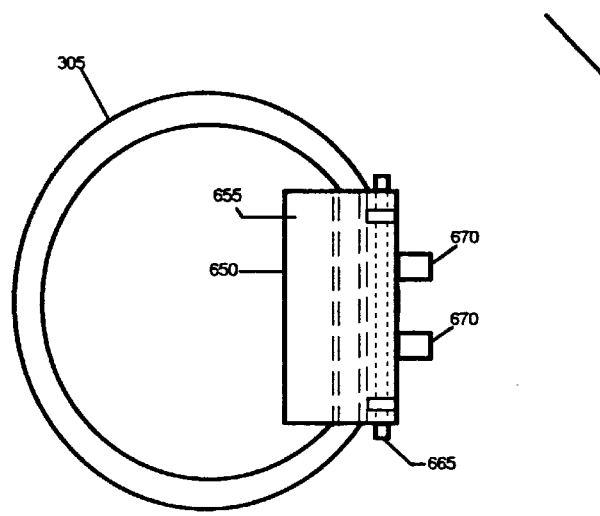
Figure 13B:
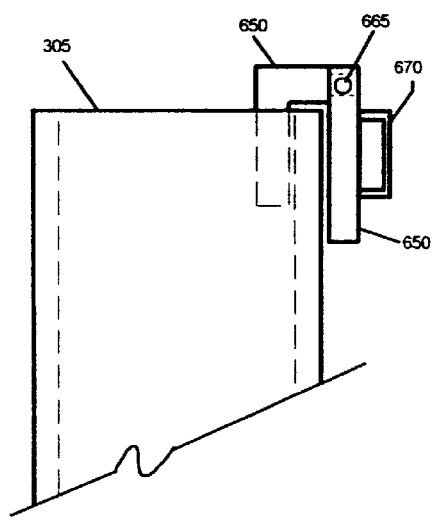
Figure 13B:
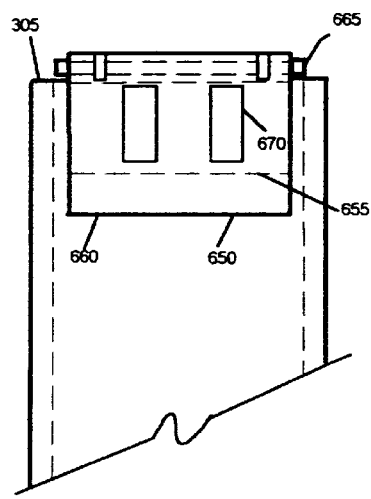

Referring now to FIGS. 13A, B, there is shown golf bag attachment device 650 of the present invention. Golf bag attachment device 650 is adapted to be detachably or fixedly secured to golf bag 305 in order to permit golf bag 305 to be attached to golf bag attachment structure 350 of golf car 338. L-shaped portion 665 of golf bag attachment device 650 can be rotatably attached to downwardly depending portion 660 and portions 665, 660 can be rotated about hinge 665 in order to removably secure attachment device 650 to the sidewall of golf bag 305. Golf bag attachment device 650 can be provided with one or more attachment loops 670, with an attachment encasement, with an attachment conduit, or with any other structure suitable for receiving attachment strap 335 to secure golf bag 305 to attachment structure 350 when attachment device 650 is attached to golf bag 305. Furthermore, a pressure sensitive securing device, a hooking device such as a hook and eyelet, a resiliently securing device, adhering substances or any other method can be used to attach golf bag attachment device 650 to golf bag 305.

Referring now to FIGS. 14–21, there is shown a plurality of alternate attachment encasements and accessory mountings for use with systems for attaching golf bags to golf cars, for example with the golf bag attachment devices of the present invention. It will be understood by those skilled in the art that all of the attachment encasements and accessory mountings disclosed herein can be molded onto golf bags 305 or otherwise formed with golf bags 305 at the time of manufacture of golf bags 305. Additionally, it will be understood that any of the attachment encasements and accessory mountings disclosed herein can be retrofitted after the time of manufacture of golf bags 305 by, for example, screw type attachments, pressure fittings, clamps or any other means.

Figure 14:
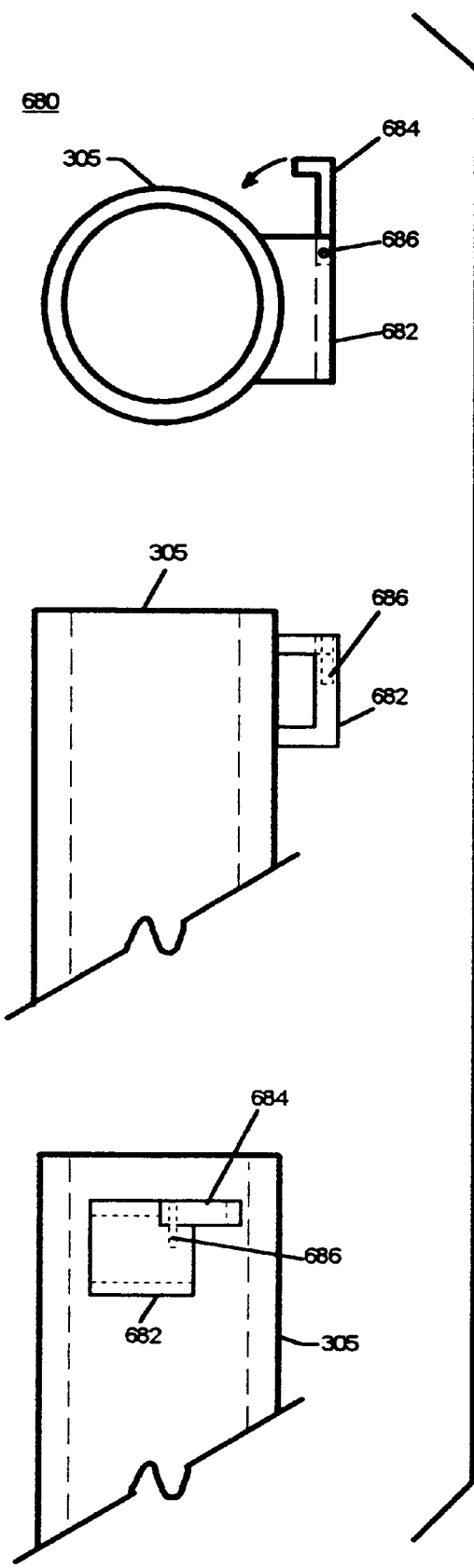
FIGS. 14–21 shows a plurality of alternate attachment encasements and accessory mountings for use with systems for attaching golf bags to golf cars.

Attachment encasement 682 of outside clamp accessory 680, shown in FIG. 14, has a pivotably attached L-shaped member 684. Attachment strap 335 is passed through attachment encasement 682 to secure golf bag 305 to golf car attachment device 350 of golf car 338 as previously described. L-shaped member 684 can then be rotated about vertical pivot 686 and rotatably forced into contact with attachment strap 335 in order to wedge attachment strap 335 tightly against the outside of golf bag 305 or one of the other walls of encasement 682 and thereby forcibly retain attachment strap 335. If attachment encasement 682 is formed with an entirely enclosed strap pass through the conduit, attachment strap 335 is wedged against one of the walls of the conduit when L-shaped member 684 is rotatably wedged. Golf bag 305 is thereby further secured to golf car attachment device 350. Hinged L-shaped member 684 is manually retracted from its wedged position against attachment strap 335 in order to release attachment strap 335 and permit attachment strap 335 to be removed from attachment encasement 682.

Figure 15:
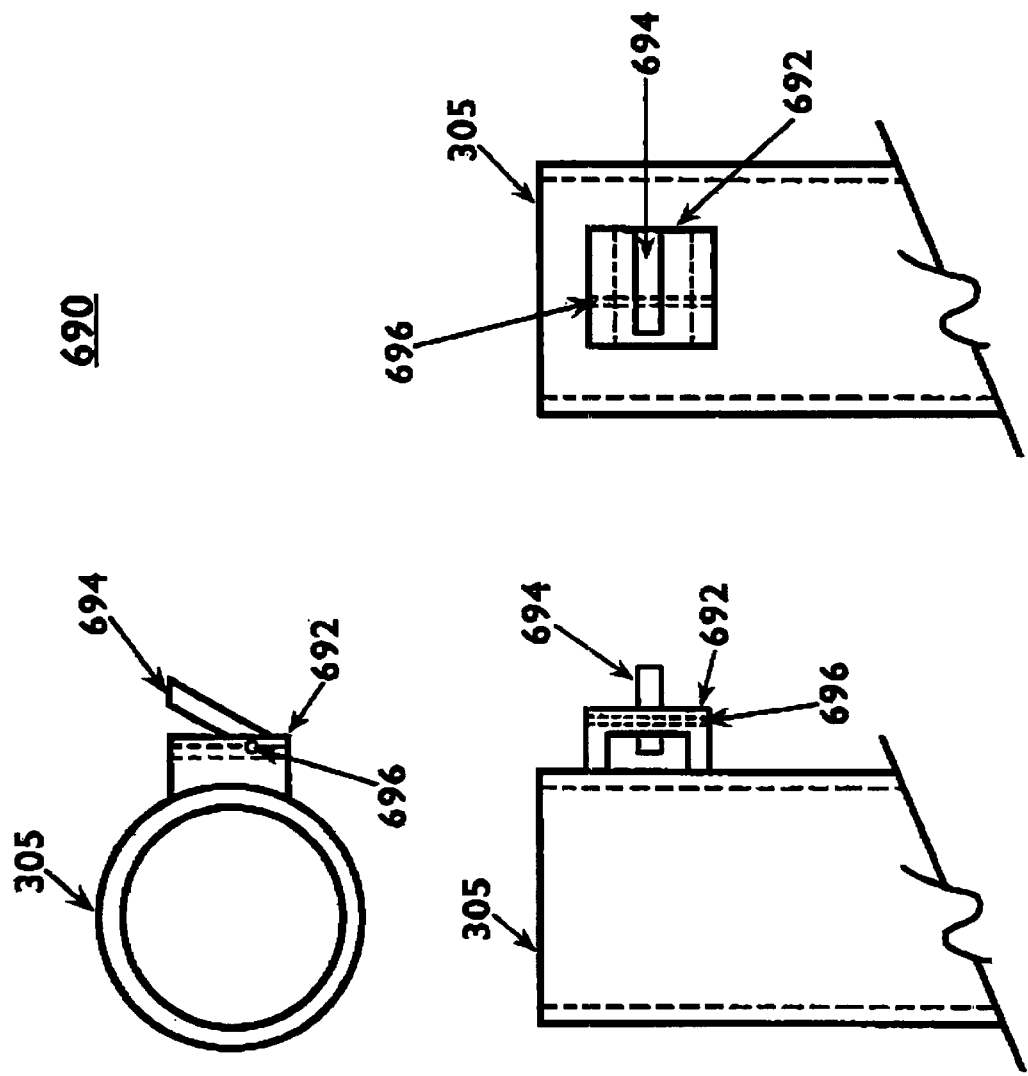

Referring now to FIG. 15, attachment encasement 692 of pressure clamp accessory 680 has a pivotably attached lever member 694. Attachment strap 335 is passed through attachment encasement 692 to secure golf bag 305 to golf car attachment device 350 of golf car 338. Lever member 694 can then be rotated about vertical pivot 696 into contact with attachment strap 335 in order to wedge attachment strap 335 tightly against the outside of golf bag 305 and thereby forcibly retain attachment strap 335. Golf bag 305 is thereby further secured to golf car attachment device 350. Lever member 694 is manually retracted from its wedged position in order to release attachment strap 335 and permit attachment strap 335 to be removed from attachment encasement 692.

Figure 16:
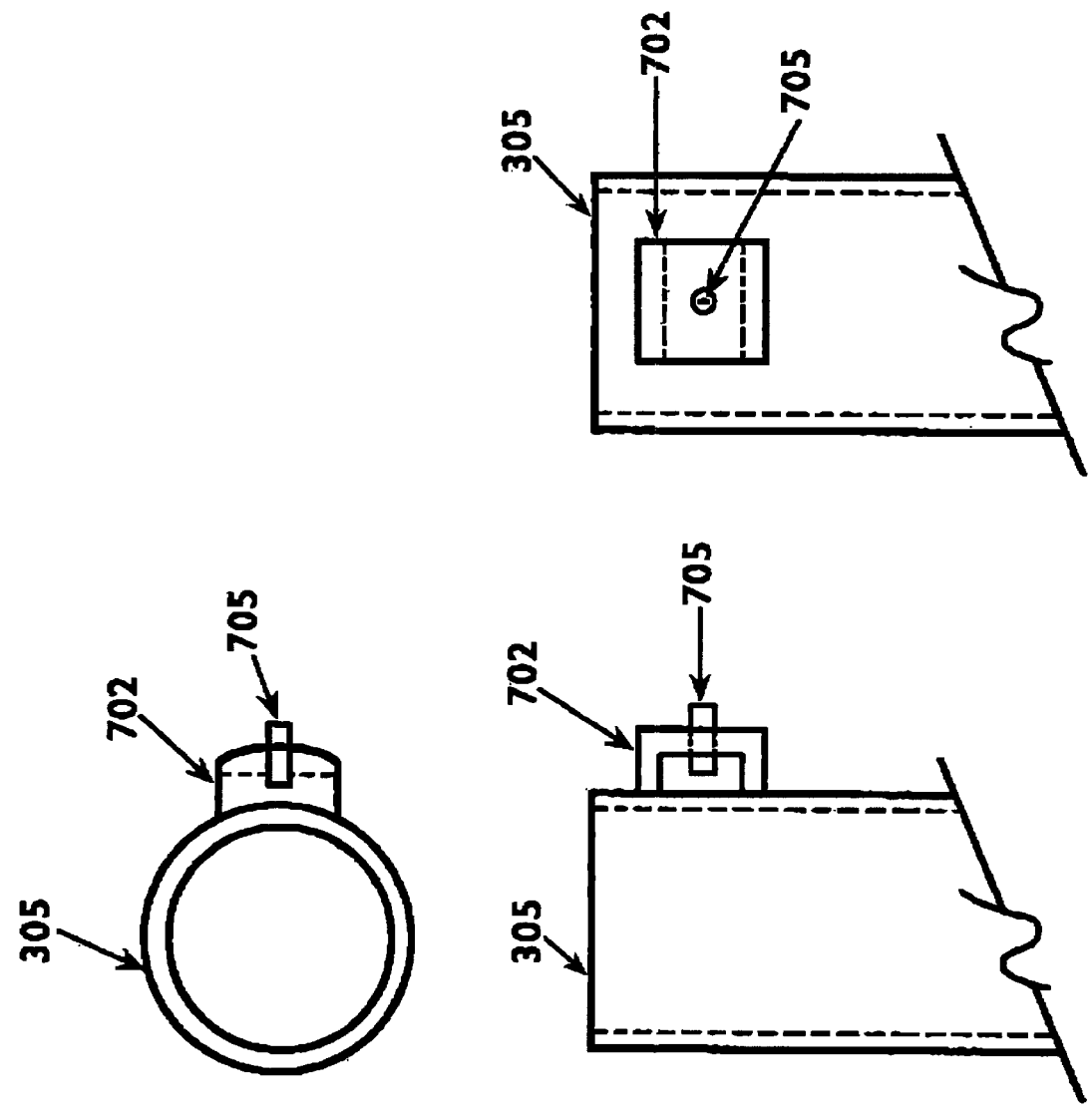

Referring now to FIG. 16, there is shown attachment encasement 702. Attachment encasement 702 receives attachment strap 335 for securing golf car 338 in the manner previously described. However, attachment encasement 702 is also provided with set screw 705 which can be a butterfly screw. When attachment strap 335 is passed through attachment encasement 702 set screw 705 is rotated in order to advance and tighten it and press attachment strap 335 tightly against the outer surface of golf bag 305. This prevents attachment strap 335 from moving through attachment encasement 702 and retains golf bag 305 more securely. Set screw 705 can be formed with wings to facilitate manual advancement and retraction of set screw 705. Additionally, the embodiment of FIG. 16 can be provided with a push in clamp rather than a set screw 705.

Figure 17:
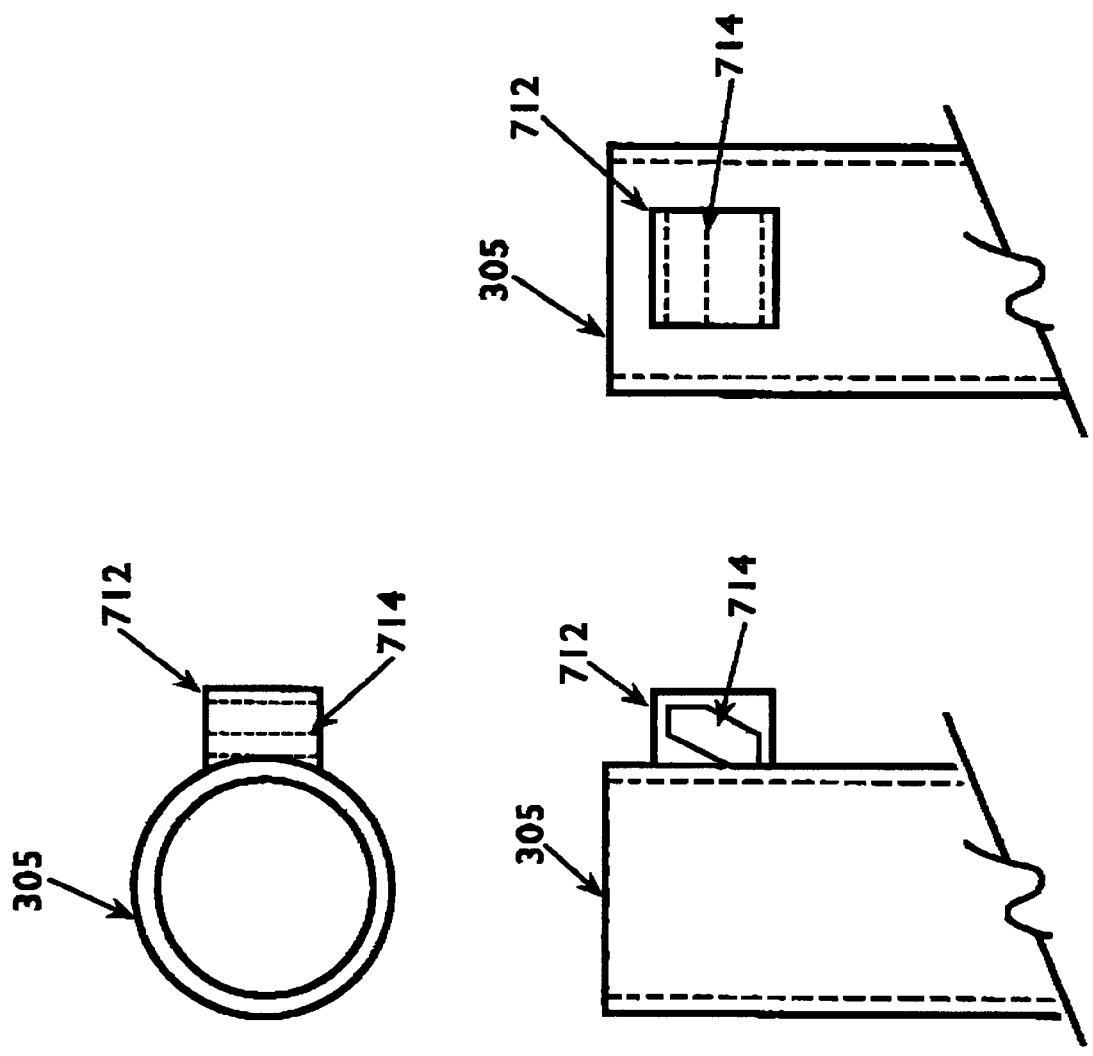

Referring now to FIG. 17, attachment encasement 712 can be disposed on the outer surface of golf bag 305 to receive attachment strap 335 as previously described. Attachment strap 335 is received by attachment encasement 712 through encasement opening 714 and rests firmly against one of the sidewalls of opening 714 when attachment strap 335 secures golf bag 305 to golf car 338. At least a portion of the sidewalls of opening 714 against which strap 335 presses is disposed at an angle with respect to the surface of golf bag 305 in order to twist attachment strap 335 and cause attachment strap 335 to be frictionally engaged to golf bag 305 when attachment strap 335 is passed through opening 714 and tightened. The sidewall of attachment encasement 712 can be disposed at any suitable angle. This causes golf bag 305 to be held firmly against its underlying support surface. Thus, attachment encasement 712 helps to more securely hold golf bag 305 in place.

Figure 18:
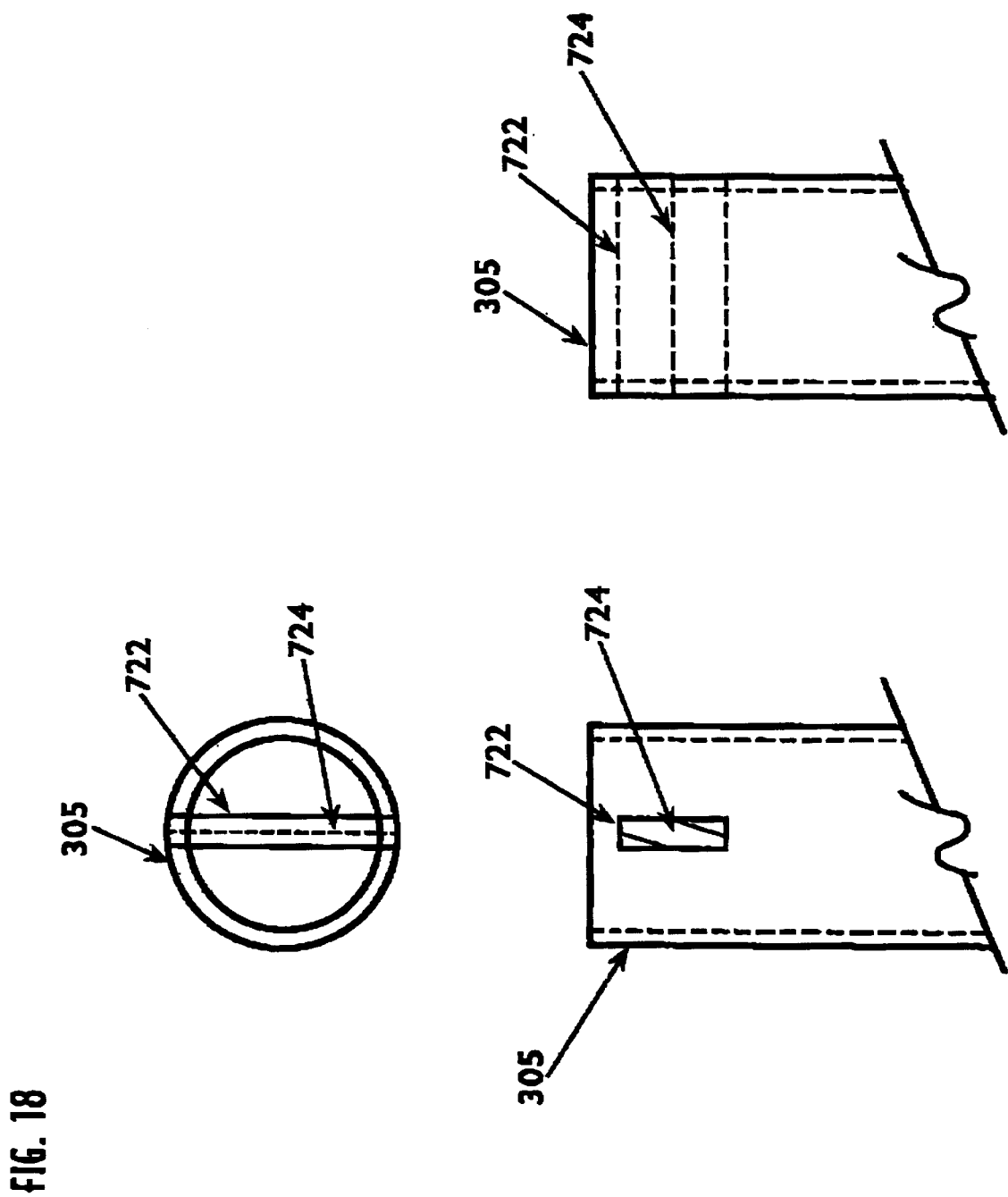

Referring now to FIG. 18, attachment conduit 722 passes through golf bag 305 and is adapted for receiving golf car attachment strap 335 to detachably secure golf bag 305 to golf car attachment structure 350 of golf car 338. Golf car attachment strap 335 is inserted into the interior of attachment conduit 722 and passed through attachment conduit 722 by way of conduit opening 724. At least one of the sidewalls of conduit opening 714 is disposed at an angle with respect to the surface of golf bag 305 in order to apply a downward force to golf bag 305 when attachment strap 335 is passed through opening 714 and tightened. This causes golf bag 305 to be held firmly against its underlying support surface. Thus, attachment encasement 722 helps to more securely hold golf bag 305 in place.

Figure 19:
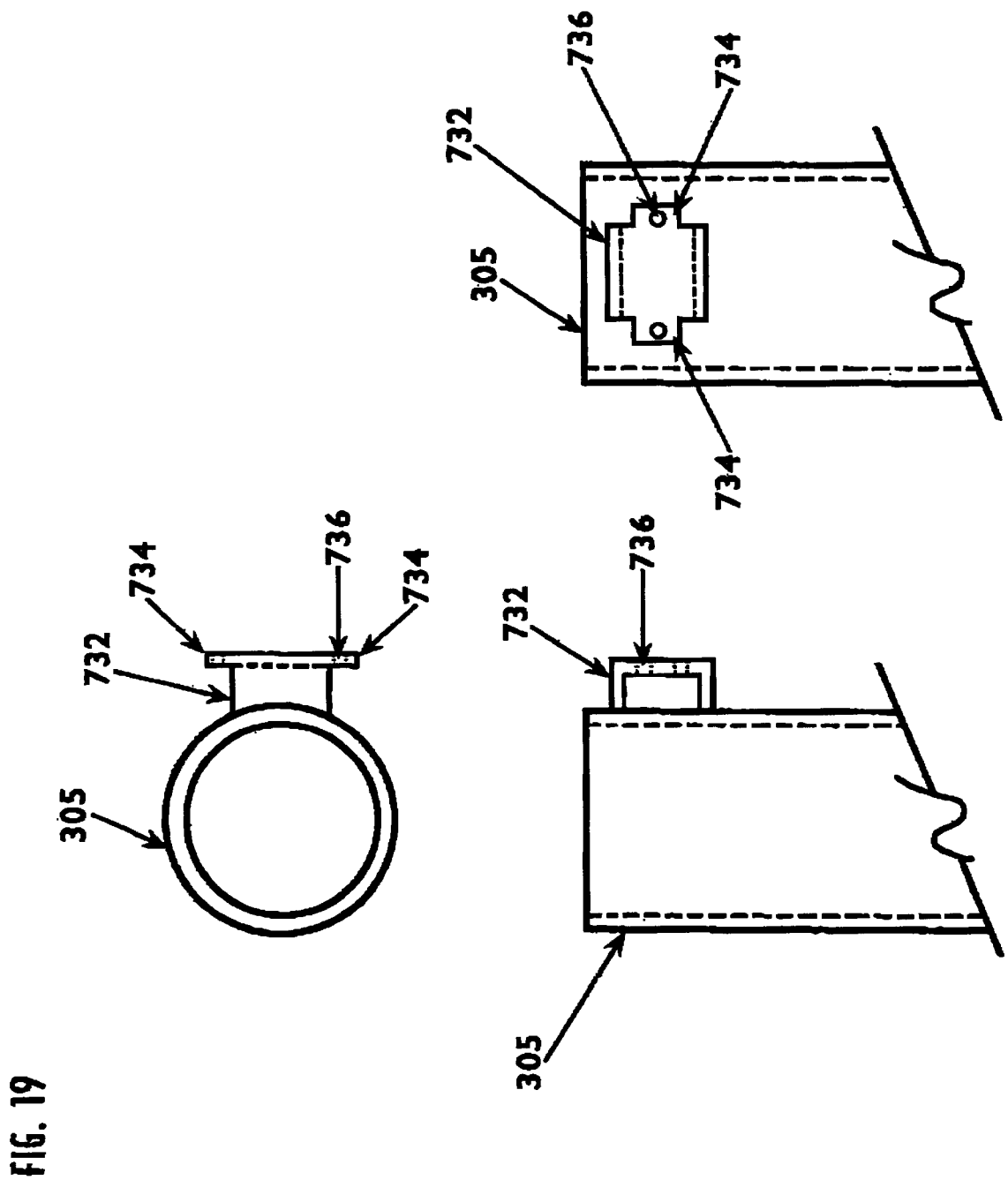

Referring now to FIG. 19, attachment encasement 732 receives attachment strap 335 for securing golf bag 305 to golf car 338 as described hereinabove. However, attachment encasement 732 is provided with outwardly extending wings 734 on one of its vertical surfaces. Wings 734 are provided with openings 736 therethrough for receiving, fastening, and supporting objects such as clipping devices. For example, a clipping device for detachably retaining gloves or towels can be provided with a hook for passing through openings 734 and detachably securing the gloves or towels to attachment encasement 732. Additionally, the winged surface of attachment encasement 732 can be provided with hook and loop fastener material for securing objects such as gloves and towels which are also provided with hook and loop material.

Figure 20:
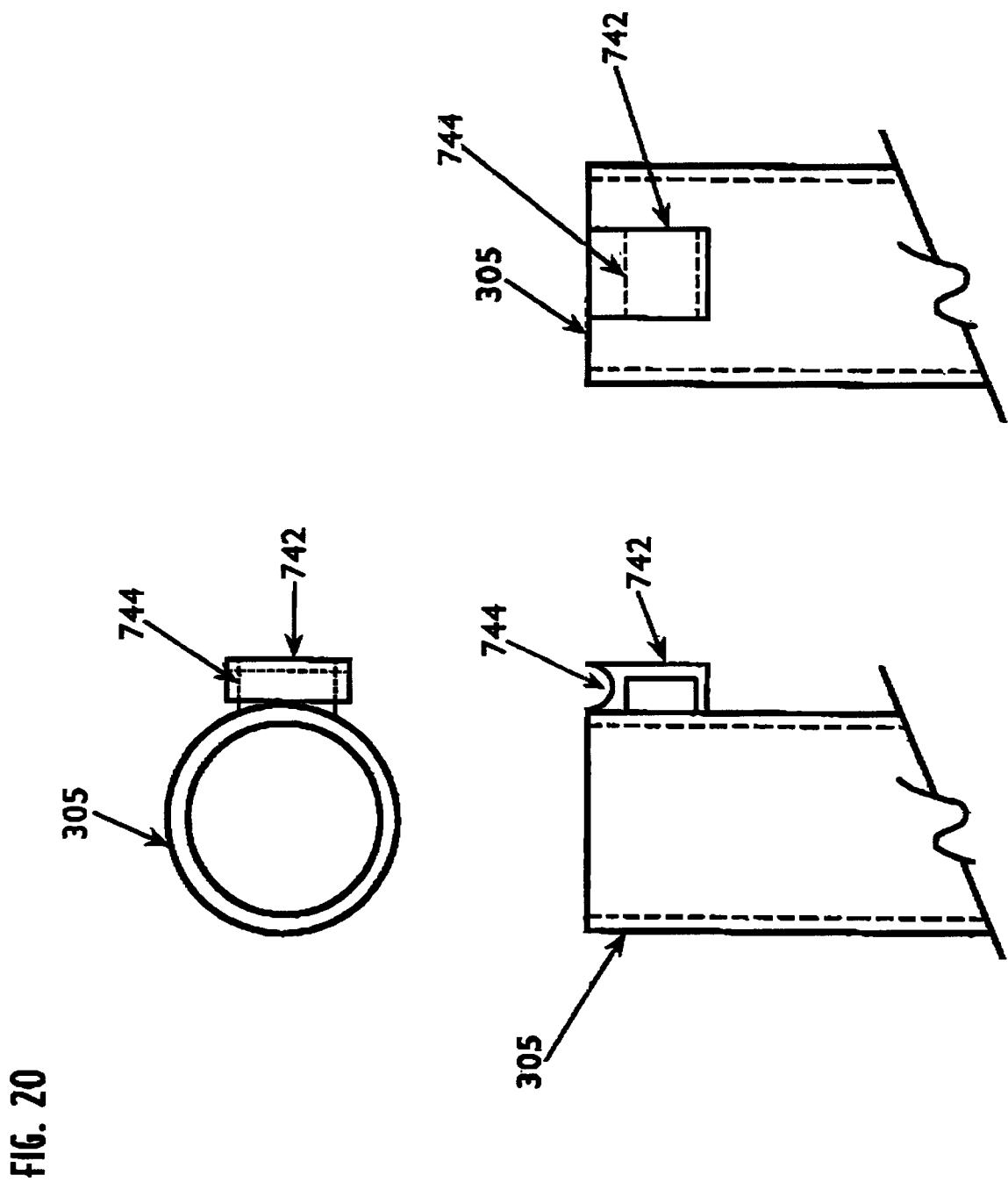

Referring now to FIG. 20, attachment encasement 742 also receives attachment strap 335 for securing golf bag 305 to golf car 338. However, attachment encasement 742 is also provided with an upwardly cupped region 744 for receiving and supporting objects such as cigars. Thus, a user of attachment encasement 742 can be relieved of attending to a cigar for a period of time by placing the cigar in upwardly cupped region 744.

Figure 21:
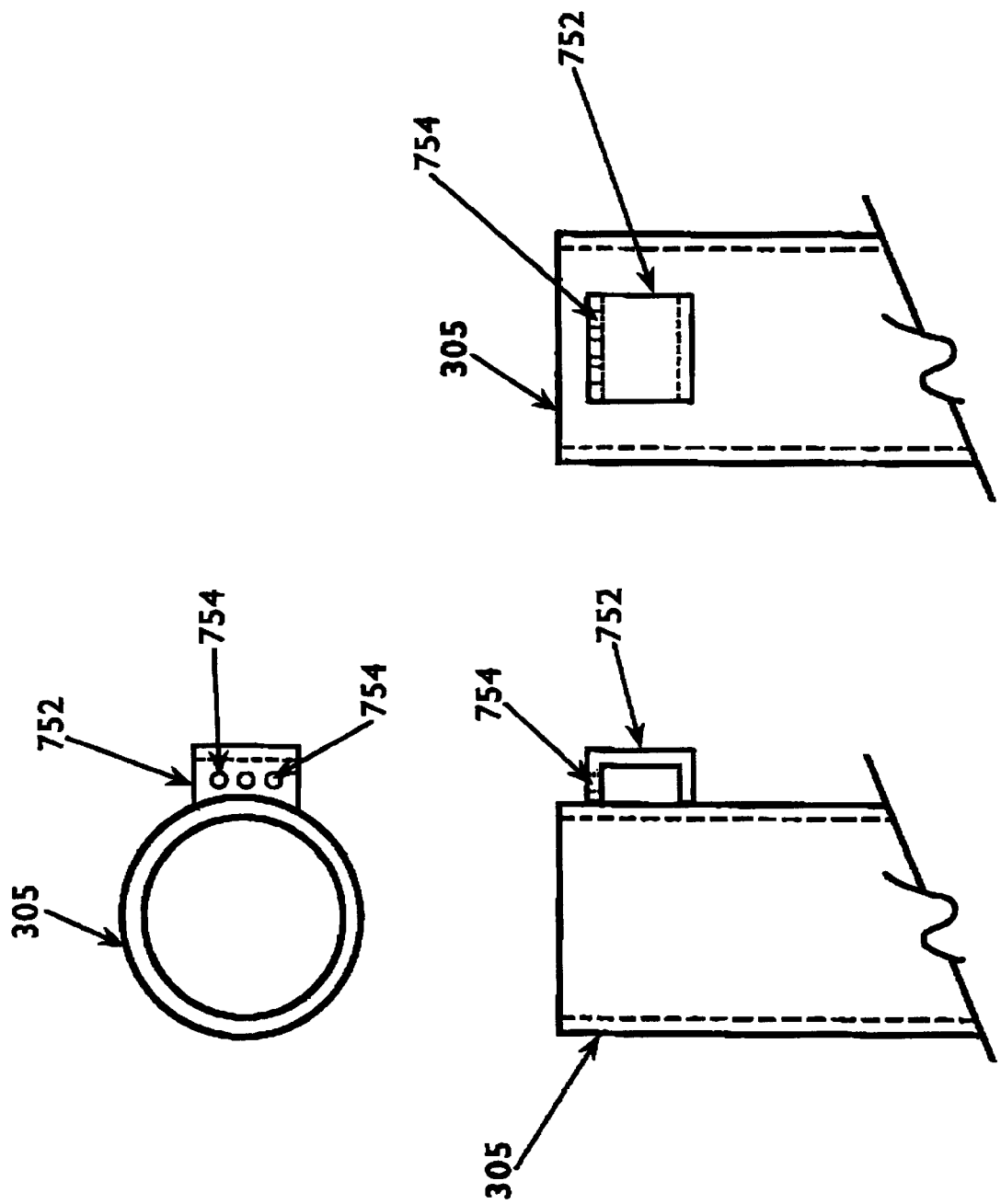

Referring now to FIG. 21, there is shown attachment encasement 752. Attachment encasement 752 receives attachment strap 335 for securing golf bag 305 to golf car 338 in the manner previously described. However, attachment encasement 752 is also provided with openings on one of its horizontal surfaces 754 for receiving and retaining objects such as pencils and golf tees. Openings 754 can be disposed on a metal, plastic, or fabric surface.

It will be appreciated by those skilled in the art that changes can be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A golf bag attachment system including a golf bag for transporting golf clubs using a golf car, comprising:
   a golf car attachment device fixedly attached to the golf car;
   a golf car attachment strap fixedly attached to the golf car attachment device;
   the golf bag including a strap attachment retainer disposed upon the golf bag and having a retainer surface for receiving and retaining the golf car attachment strap within the strap attachment retainer and an object receiving opening passing through the retainer surface for receiving and retaining a further object therein;

the strap attachment retainer having a vertical retainer surface wherein the object receiving opening passes through the vertical retainer surface for thereby retaining the further object; and the vertical retainer surface having outwardly extending wings wherein the object receiving opening passes through the wings.

2. The golf bag attachment system of claim 1, wherein the strap attachment retainer comprises a strap attachment device coupled to the golf bag for receiving and forcibly retaining the attachment strap to secure the golf bag to the golf car.

3. The golf bag attachment system of claim 1, wherein the strap attachment retainer comprises a horizontal surface wherein the object receiving opening passes through the horizontal surface for retaining objects thereby.

4. A golf bag attachment system including a golf bag for transporting golf clubs using a golf car, comprising:

a golf car attachment device fixedly attached to the golf car;

a golf car attachment strap fixedly attached to the golf car attachment device;

the golf bag including a strap attachment retainer disposed upon the golf bag and having a retainer surface for receiving and retaining the golf car attachment strap within the strap attachment retainer and an object receiving opening passing through the retainer surface for receiving and retaining a further object therein; and the strap attachment retainer having an upwardly extending retaining cup.

5. The golf bag attachment system of claim 4, comprising a further strap having a further strap attachment for attaching the further strap to the golf bag and carrying the golf bag with the further strap.

6. The golf bag attachment system of claim 5, wherein the attachment device includes a tightening device for detachably securing the attachment strap to the attachment device.

7. The golf bag attachment system of claim 5, wherein the attachment device comprises an attachment encasement for passing the attachment strap therethrough.

8. The golf bag attachment system of claim 5, wherein the attachment device comprises a fastener for detachably retaining objects.

9. The golf bag attachment system of claim 6, wherein the tightening device is rotatable.

10. The golf bag attachment system of claim 9, wherein the tightening device is rotatably advanced toward the attachment strap.

11. The golf bag attachment system of claim 6, wherein the tightening device forcibly retains the attachment strap by pressing the attachment strap against the golf bag.

12. The golf bag attachment system of claim 6, wherein the tightening device compressibly secures the attachment strap.

13. The golf bag attachment system of claim 6, wherein the tightening device comprises a wedge.

14. The golf bag attachment system of claim 13, wherein the wedge comprises a pivotable wedge.

15. The golf bag attachment system of claim 6, wherein the tightening device comprises a lever.

16. The golf bag attachment system of claim 6, wherein the tightening device comprises a set screw.

17. The golf bag attachment system of claim 6, wherein the tightening device comprises a push in clamp.

\* \* \* \* \*